United States Patent [19]

Kita et al.

[11] Patent Number: 5,729,360
[45] Date of Patent: Mar. 17, 1998

[54] COLOR IMAGE PROCESSING METHOD AND SYSTEM

[75] Inventors: Shinji Kita; Hitoshi Ogatsu; Noriyuki Kazama; Kazumasa Murai; Yuzuru Suzuki, all of Ebina, Japan

[73] Assignee: Fuji Xerox Co., Ltd., Tokyo, Japan

[21] Appl. No.: 371,982

[22] Filed: Jan. 13, 1995

[30] Foreign Application Priority Data

Jan. 14, 1994 [JP] Japan .................................. 6-014948
Jan. 14, 1994 [JP] Japan .................................. 6-014949

[51] Int. Cl.$^6$ ................................................ H04N 1/46
[52] U.S. Cl. .................... 358/500; 358/532; 358/448; 382/254; 382/266
[58] Field of Search ........................ 358/500, 501, 358/532, 448, 462, 447, 455, 456, 458, 464; 382/266, 254, 269, 274, 162

[56] References Cited

U.S. PATENT DOCUMENTS 5,231,677  7/1993  Mita et al. .......................... 358/462
5,361,147  11/1994  Katayama et al. .................. 358/532

FOREIGN PATENT DOCUMENTS 57-173838  3/1982  Japan .
59-161981  3/1983  Japan .
59-163973  3/1983  Japan .
58-190951  4/1983  Japan .
58-211757  5/1983  Japan .
5-21384   3/1993  Japan .
5-21385   3/1993  Japan .
5-56068   8/1993  Japan .

OTHER PUBLICATIONS

"Consideration of Inking of Printing (I)," First Color Engineering Conference Paper Collection, Optics 4 Society, pp. 1–7, Proceedings of 1st Joint Conference on Color Technology, Nov. 20–21, 1984.
J.A.C. Yule, "Color Reproduction Theory," Print Society Publication Department, 1971, pp. 247–248.
John Wiley & Sons, "Digital Document Processing," pp. 26–32.

*Primary Examiner*—Thomas D. Lee
*Attorney, Agent, or Firm*—Finnegan, Henderson, Farabow, Garrett & Dunner, L.L.P.

[57] ABSTRACT

A color image processing system for generating recorder image signals of four colors containing India ink from three color signals, the color image processing system includes a converter for converting three color signals into separated brightness and chromaticity signals; a range converter for converting the brightness signal into a range converted brightness signal which is within a record color reproduction range; an edge detector for obtaining an edge amount signal from the range converted brightness signal; a chroma detector for detecting chroma of an image signal from the chromaticity signal; an edge enhancer for enhancing an edge part of an image represented by the range converted brightness signal; a smoothing circuit for smoothing the range converted brightness signal; a brightness and chromaticity converter which includes a converter for executing brightness conversion by mixing an output of the edge enhancer and an output of the smoothing circuit according to the edge amount signal detected by the edge detector and a converter for executing chromaticity conversion for providing a chromaticity signal corresponding to compression/expansion of the chroma according to an output of the edge detector and an output of the chroma detector; and a record color converter for generating recorder image signals of four colors containing India ink according to an output of the brightness and chromaticity converter using a color conversion table.

22 Claims, 12 Drawing Sheets

COLOR IMAGE PROCESSING METHOD AND SYSTEM

BACKGROUND OF THE INVENTION

1. (Field of the Invention)

This invention relates to an image processing method and system used for digital full-color copiers, color facsimile machines, image file systems, etc., for reading a color document, applying image processing to the document, and reproducing a document image on a recording medium and in particular to an image processing system and method for optimally processing a document with characters and half-tone images mixed.

2. (Description of the Related Art)

Hitherto, normally 4-color print has been used when a color original image is recorded and reproduced in print technologies. That is, color separation plates for color inks of colors of yellow, magenta, cyan, and India ink are prepared because for 3-color print of yellow, magenta, and cyan, for example, inks do not have an ideal color development characteristic and can only provide reproduced images poor in image contrast.

In 4-color printing, so-called 100% ground color removal may be executed for print inks of yellow, magenta, and cyan. This is a system which reproduces an image in two colors selected among yellow, magenta, and cyan and with India ink; a color reproduction area in a low-lightness portion widens and gray stability in a high-lightness portion can also be maintained high. The color removal also produces the effect of reducing the consumption amount of expensive color ink for lowering running costs.

Thus, the 4-color printing with the ground color removal provides various advantages. However, how to determine the ground color removal amount and India ink amount in response to an input image signal is difficult in the 4-color printing. For example, since Indian ink has a large contrast to other color inks, image roughness is comparatively remarkable and India ink is hard to use in the skin parts of an image. Also, generally it is necessary to increase the India ink amount for raising clarity of characters on a character image as compared with a photo image.

To solve this problem, various methods for determining the ground color removal amount and the India ink amount at print color scanners are proposed, for example, in Japanese Patent Laid-Open Nos. Sho 57-173838, 58-190951, 58-211757, etc.

The method disclosed in Japanese Patent Laid-Open No. Sho 57-173838 is characterized by the fact that ground color removal is executed separately for each of an achromatic color area and a chromatic color area. In the method, the achromatic color area is reproduced with only India ink and the Indian ink amount is changed gradually in the transition area from the achromatic to chromatic color area.

In Japanese Patent Laid-Open Nos. Sho 58-190951 and 58-211757 mentioned above, a method for determining the India ink amount and the ground color removal amount depending on the input image gradation value is disclosed. This method provides a complete achromatic color structure up to the gray level corresponding to the top tone of India ink used and increases color ink continuously in the shadow portions exceeding the gray level. That is, gray portions are reproduced only with India ink up to a given density value reproducible with India ink and at higher gray density values, equal amounts of other three color inks are added for reproducing high-density gray.

Methods for determining the ground color removal amount and the India ink amount in digital color recording systems such as ink jet, thermal transfer recording, and laser color xerography are disclosed, for example, in Japanese Patent Laid-Open Nos. Sho 59-161981, 59-163973, etc. In the method disclosed in Japanese Patent Laid-Open No. Sho 59-161981, the minimum values of three color signals of yellow, magenta, and cyan are multiplied by one constant to find an amount of India ink and the India ink is subtracted from each color signal for executing ground color removal. In the method disclosed in Japanese Patent Laid-Open No. Sho 59-163973, two color inks to be combined with Indian ink are determined based on the spectral reflection factors of a plurality of color inks and recording is performed so as to prevent the two color inks and India ink from overlapping each other, whereby the India ink amount and the ground color removal amount are determined by simple operations.

In the conventional examples we have discussed, optimum image processing methods for character and photo images are provided by controlling the India ink amount and the ground color removal amount in color processing.

On the other hand, optimum image processing methods for character and photo images are carried out by performing optimum edge processing for each type of image. The configuration and operation of an example of conventional edge enhancement processing at a digital full-color copier will be discussed with reference to FIG. 18. In the figure, R, G, and B are color signals read by scanning a color document. The color signals R, G, and B are input to a half-tone image filter processing circuit 601, a character image filter processing circuit 602, and an area identification circuit 609 in parallel. The half-tone image filter processing circuit 601 is a two-dimensional filter for performing band enhancement processing by assuming that the object pixel area is a half-tone image area. The frequency characteristic of this filter is set so as to remove half-tone dot components of a document and raise clarity of the image. The character image filter processing circuit 602 performs enhancement processing of edge components by assuming that the object pixel area is a character image area.

Outputs of the half-tone image filter processing circuit 601 and the character image filter processing circuit 602 thus provided are switched by a selector 603 in response to a determination signal from the area identification circuit 609 described below for outputting to a color processor at the following stage. The area identification circuit 609 consists of a hue identification circuit 604, a threshold value storage ROM 607 for storing area determination threshold values, a signal synthesizing circuit 605, an edge signal generator 606, and a comparator 608. The signal synthesizing circuit 605 generates a brightness signal from color signals R, G, and B. The edge signal generator 606 inputs the brightness signal, calculates a difference between the maximum and minimum values in an N×N pixel window centering around the object pixel, and outputs the difference as an edge signal. The comparator 608 compares the edge signal with a specific threshold value. If it is equal to or greater than the threshold value, the comparator 608 outputs 1 as a character image area to the selector 603; if it is less than the threshold value, the comparator 608 outputs 0 as a half-tone image area to the selector 603. The hue determination circuit 604 identifies the hue of the object pixel as one of seven hues of yellow, magenta, cyan, black, red, green, and blue, and outputs a hue signal. The threshold value storage ROM 607 uses the hue signal as an address to output a determination threshold value for identifying an area in response to the hue to the comparator 608, which then compares the threshold value for each hue with the edge signal. In these steps, whether the image is a half-tone or photo image is determined, and edge enhancement processing appropriate for each image is selected and executed.

Generally, the above-mentioned color processing and edge processing are performed in combination as an image processing system for optimally processing a document with character and half-tone images mixed. That is, whether the image is a half-tone or photo image is determined by processing as shown in FIG. 18, then the India ink amount and the ground color removal amount in the above-mentioned color processing are controlled based on the determination result for separately accomplishing India-ink monochrome reproduction for black characters and optimum color processing for half-tone images.

The configuration of the edge enhancement processing as described above has the effect of suppressing noise in an image signal caused by edge enhancement, but the half-tone image processing and the character processing are discontinuous, thus an unnatural defect appears on a reproduced image. In the area identification processing, if an attempt is made to identify a character area with slightly small edge components, a half-tone area with slightly large edge components is erroneously determined to be a character area and a half-tone image cannot smoothly be reproduced. If an attempt is made to eliminate the erroneous determination, only character areas with sufficiently large edge components can be identified, worsening reproductivity of characters. There is also a fear that the color of an image signal will become achromatic by the fact that the signal after edge enhancement exceeds the dynamic range of the image signal.

The conventional color processing methods described above introduces the following problems: The method for executing ground color removal separately in an achromatic area and a chromatic area, disclosed in Japanese Patent Laid-Open No. Sho 57-173838 requires a large number of adjustment coefficients when the India ink amount and the ground color removal amount are determined. These coefficients can be determined still only experientially, and the difficulty in determining the India ink amount and the ground color removal amount cannot be solved.

In Japanese Patent Laid-Open Nos. Sho 58-190951 and 58-211757, the methods for determining the India ink amount and the ground color removal amount depending on the gradation value are disclosed, but only the processing method in a gray reproduction portion is described here, and there is a fear that a pseudo outline of color, namely, a chroma gap will occur when the transition is made from an achromatic color area to a chromatic color area, that is, on an image whose chrome gently changes like general patterns.

The method disclosed in Japanese Patent Laid-Open No. Sho 59-161981, which is generally called constant ratio ground color removal, ground color addition, involves a problem that it is incapable of accurate color reproduction. The reason why accurate color reproduction cannot be executed is described, for example, in "Consideration of Inking in Printing (I)," First Color Engineering Conference Paper Collection, Optics 4 Society, 1984, 1–7, etc.

The method disclosed in Japanese Patent Laid-Open No. Sho 59-163973, which performs operations based on principles of average additive color mixture, involves a problem that accurate color reproduction cannot be executed at actual recording. This is caused by light penetration and light diffusion, for example, as described in "Color Reproduction Theory," written by J. A. C. Yule, Print Society Publication Department, 1971, p. 247–p. 248

Thus, an image processing system which can optimally process a document with character and half-tone images mixed without any unnatural defect is not yet proposed.

SUMMARY OF THE INVENTION

It is therefore an object of the invention to provide a color image processing method and system for reducing image roughness for half-tone images and improving black character quality and color character quality for character images in processing of images with character and half-tone images mixed.

It is another object of the invention to provide a color image processing system which can perform accurate color reproduction by simple operations without need for experiential parameter adjustments.

It is a further object of the invention to provide a color image processing system which can perform printing with additional India ink and ground color removal without generating any unnatural chroma gap between achromatic and chromatic color areas.

According to the invention, there is provided a color image processing method comprising the steps of executing range conversion of a brightness signal of brightness and chromaticity separation signals so that it enters a record color reproduction area, obtaining an edge amount signal from the brightness signal, obtaining a brightness signal smoothing an image and a brightness signal enhancing an edge part from the brightness signal, obtaining a chroma signal of an image from a chromaticity signal of the brightness and chromaticity separation signals, mixing the brightness signal smoothing the image and the brightness signal enhancing the edge part based on the edge amount signal and providing a chromaticity signal corresponding to compression or expansion of the chroma based on the edge amount signal and the chroma signal (brightness and chromaticity conversion step), preparing a color conversion table, and converting conversion signal provided in the brightness and chromaticity conversion step into output unit image signals of four colors containing India ink using the color conversion table, wherein the color conversion table contains a color conversion table in which record color data other than India ink is set to 0 for conversion of a signal of achromatic color having low brightness.

According to the invention, there is provided a color image processing system for generating recorder image signals of four colors containing India ink from three color signals, the color image processing system comprising means for converting three color signals into brightness and chromaticity separation signals, range conversion means for converting the brightness signal so that it enters a record color reproduction range, edge detection means for obtaining an edge amount signal from the brightness signal whose range is converted, means for detecting chroma of an image signal from the chromaticity signal, edge enhancement means for enhancing an edge part of an image represented by the brightness signal whose range is converted, means for smoothing the brightness signal whose range is converted, brightness and chromaticity conversion means comprising means for executing brightness conversion by mixing an output of the edge enhancement means and an output of the smoothing means based on the edge amount signal detected by the edge detection means and means for executing chromaticity conversion for providing a chromaticity signal corresponding to compression or expansion of the chroma using an output of the edge detection means and an output of the chroma detection means, and record color conversion means for generating recorder image signals of four colors containing India ink using a color conversion table from an output of the brightness and chromaticity conversion means.

The range conversion means has a conversion characteristic set according to a parameter $P_0$ for defining white points of an image and parameters $P_1$ and $P_2$ for compressing the brightness signal within the color reproduction range of the recorder.

The edge detection means and the chroma detection means comprise nonlinear conversion means of the detection signal and the conversion parameters of the nonlinear conversion means can be set changeably from the outside. The nonlinear conversion means of the edge detection means has a conversion characteristic with a conversion output signal fe normalized between 0 and 1 and controlled according to a plurality of parameters.

These parameters consist of a first parameter $e_0$ for controlling an upper limit value of the conversion output signal fe set to 0 and a second parameter $e_1$ for controlling a lower limit value of the conversion output signal fe set to 1. The nonlinear conversion means for executing nonlinear conversion of an output of the chroma detection means has a conversion characteristic with a conversion output signal fc normalized between 1 and −1 and controlled according to a plurality of parameters. These parameters consist of a first parameter $C^*_1$ for controlling an upper limit value of the conversion output signal fc set to −1, a second parameter $C^*_2$ for controlling a lower limit value of the conversion output signal fc set to 0, a third parameter $C^*_3$ for controlling an upper limit value of the conversion output signal fc set to 0, and a fourth parameter $C^*_4$ for controlling a lower limit value of the conversion output signal fc set to 1.

A specific area centering on achromatic color having low brightness in which record color data other than India ink is set to 0 is set in the color conversion table. The percentage of India ink of the color conversion table data and minimum value of record color data YMC other than India ink (India ink/minimum value of YMC) decreases monotonically with an increase in the chroma. The relationship between India ink of the color conversion table data and minimum value of record color data other than India ink is set by four parameter sets of brightness and chroma at most. Different types of data are provided in the color conversion table for selection in response to an image reproduction mode.

In the invention, three color signals input through a color image input unit, etc., are converted into brightness and chromaticity separation signals which are at an equal rate in perception. Specifically, 1976 CIE L*a*b* signals, etc., correspond to the signals. Edge processing and color processing (printing with additional India ink and ground color removal) described below are performed based on the signals, whereby processing fitted to human sense is enabled and the process configuration can be generalized independently of the characteristics of the image input unit. The range conversion means executes proper range conversion for the brightness signal after conversion to brightness and chromaticity separation signals, and brightness signal in a high-density portion is compressed within a predetermined range. This compression is useful particularly in the reproducing mode of a document with character and half-tone images mixed.

The edge detection means provides an edge amount signal. In the process, for example, a difference is calculated between an object pixel in the brightness signal of the brightness and chromaticity separation signals and a plurality of peripheral pixels existing within a predetermined distance range from the target pixel, thereby detecting the edge amount e of the object pixel. The chroma detection means detects the chroma C* of the object pixel or object pixel peripherals from the chromaticity signal of the brightness and chromaticity separation signals.

Next, the brightness and chromaticity conversion means first mixes an output of the edge enhancement means and an output of the smoothing means based on the edge amount signal detected by the edge detection means, thereby executing brightness conversion. Specifically, the edge amount signal is converted into a continuous amount fe normalized between 0 and 1 using a nonlinear function that can be adjusted from the outside for providing continuous edge signal fe quantifying information on the frequency characteristic of the image and its tone contrast. With the edge signal fe as weight, the output of the smoothing means, namely, filter output P preset for half-tone image processing and the output of the edge enhancement means, namely, filter output C preset for character image processing are mixed using the edge signal fe as in $$T = fe \cdot C + (1-fe) \cdot P \qquad (1)$$

If the maximum value limiting means is provided, the brightness signal after the filter processing is limited by limit value L (fe, C*) determined by the chroma C* and the edge signal fe as in $$\text{IF } T > L(fe, C^*) \text{ THEN } T = L(fe, C^*) \qquad (2)$$

The limit value L (fe, C*) is set so as to become a light value as both the edge signal fe and the chroma signal C* become large. That is, if the edge signal is small, the limit value L (fe, C*) does not work for a photo image. Although the edge signal is large, if the chroma signal C* is small, the limit value L (fe, C*) does not work for a black character. If both the edge signal and the chroma signal C* are large, the limit value L (fe, C*) most works for a color character, limiting so that the brightness signal does not fall below a given value. This prevents unnecessary color from mixing with a color character.

On the other hand, chromaticity conversion is executed for providing the chromaticity signal corresponding to compression or expansion of chroma using an output of the edge detection means and an output of the chroma detection means. Specifically, using signal fc provided by nonlinear conversion of the chroma signal C* and normalization between −1 and 1 and the edge signal fe, coefficient k is calculated according to the following expression:

$$k = 1 + fe \cdot fc \qquad (3)$$

The coefficient k is operated on chromaticity signal Qi (i=1, 2) to provide chromaticity signal Qi' after processing according to the following expression:

$$Qi' = k \cdot Qi \qquad (4)$$

The chroma conversion signal fc changes monotonically from −1 to 1 in response to the chroma signal C*. That is, fc is around −1 in a low chroma portion and as the chroma increases, it changes to 1. If the edge signal is small, namely, if the image is like a photo, fe≈0, thus k≈1 independently of the chroma conversion signal fc. In this case, the chromaticity signal does not change before and after the processing. If both the edge signal and the chroma signal C* are large, namely, if the image is like a color character, fc becomes positive and k>1. As a result, the chromaticity signal Qi' after processing is enhanced in chroma. If the edge signal is large and the chroma signal C* is small, namely, if the image is like a black character, fc becomes negative and 0≦k<1. As a result, the chromaticity signal Qi' after processing is compressed in chroma and is attracted to achromatic color. In FIG. 17, the brightness of brightness and chromaticity separation signals is used to enter the vertical axis and the chroma calculated from the chromaticity is used to enter the horizontal axis; the solid line represents a record color reproduction area. Generally, a black character in white ground and input image signal in a color character portion are positioned on a straight line connecting the white ground and document color coordinates for the color character and shift in a slight chroma direction from the straight line connecting the white ground and document color coordinates for the black character (in FIG. 17, ■ denotes the black character and ● denotes the color character) with respect to the original color coordinates of the document (in FIG. 17, □ denotes the black character and ○ denotes the color character). This characteristic depends on the MTF characteristic and pixel shift performance of the image input unit. Generally, with a digital full-color copier, a contract or reduction type CCD image input unit is used for performing four scans for each record color cycle. The black character portion which should be read as black has slight chroma because of the RGB balance difference in vibration and MTF characteristic in each scan. Normally, the absolute value of MTF is 50-70% at 41 p/mm. As a result, black character and color character input signals move to interpolation points on the straight line connecting the white ground and document color coordinates as in FIG. 17. This effect is remarkable particularly for 8-point or less characters and preferably, the color coordinates of input signal (in FIG. 17, □ denotes the black character and ○ denotes the color character) are restored to the color coordinates of the original document by prediction (in FIG. 17, ■ denotes the black character and ● denotes the color character). According to edge processing in the invention, the input color coordinates of the color character in FIG. 17 (○ in FIG. 17) is enhanced within the range in which the brightness is limited and also enhanced in the chroma direction and become the color coordinates of the original document (● in FIG. 17). The input color coordinates of the black character in FIG. 17 (□ in FIG. 17) is enhanced in brightness and also compressed in the chroma direction and becomes the color coordinates of the original document (■ in FIG. 17).

Brightness signal mixing and limitation and compression and enhancement degrees in the chroma direction are controlled by the parameters of the nonlinear conversion means of the edge detection means and the chroma detection means. The conversion parameters are set changeably from the outside. Necessary edge enhancement is made for character images by such edge processing and conversion to the color coordinates of the original document is executed. Necessary smoothing processing is performed for half-tone images. At the time, continuous edge signal is used for determination in the invention, thus an unnatural defect as in the conventional edge processing does not occur.

Next, the brightness and chromaticity separation signals converted by the edge processing are input to the record color conversion means for conversion to output unit image signals of four colors CMYK containing India ink. Preferably, the art described in Japanese Patent Laid-Open No. Hei 5-110840, one example of a table-type color converter is used as the record color conversion means. In the art, data of predetermined high-order bits (Lu, au, bu) of the brightness and chromaticity separation signals is used as an address and its corresponding 4-color (CMYK) data and differential coefficients are held. The data and low-order bit (P__Lu, P__au, P__bu) data $L*_L$, $a*_L$, and $b*_L$ are used to perform interpolation operation. For example, to calculate record color signal Y from the brightness and chromaticity separation signals, the contents of the predetermined high-order bits (Lu, au, bu) of the brightness and chromaticity separation signals $\{L*_0, a*_0,$ and $b*_0\}$ are used as address $\{L, a, b\}$ and lattice point output $Y_0$ and differential coefficients $\partial Y/\partial L*$, $\partial Y/\partial a*$, and $\partial Y/\partial b*$ at the address are read in parallel from the table. The record color signal Y is calculated and output according to the following expression (5):

$$Y=Y_0+\partial Y/\partial L*XL*_L+\partial Y/\partial a*X a*_L+\partial Y/\partial b*X b*_L \qquad (5)$$

4-color (CMYK) data for reproducing the brightness and chromaticity separation signals faithfully at the recorder is set in each lattice point data in the table. At the time, since the brightness and chromaticity separation signals are three input and the record color signals are four outputs, one freedom degree exists. In the invention, the freedom degree is defined by the UCR percentage and controlled by the brightness and chroma. More than one UCR percentage definition is assumed according to the output image type and controlled by four points on a brightness-chroma plane ($P_1$, $P_2$, $P_3$, and $P_4$) as shown in FIG. 15. $P_1$, $P_2$, $P_3$, and $P_4$ are set so that the UCR percentage becomes 100% in the vicinity of achromatic color and becomes 0% at a given chroma or more. This means that reproduction in the vicinity of achromatic color becomes substantial India ink monochrome reproduction and that reproduction at a given chroma or more becomes 3-color reproduction.

Further, to realize India ink monochrome reproduction of black characters and satisfy faithful color reproduction of half-tone images, an area in which record color data other than India ink in color conversion table data is set to 0 is set as a specific area centering on achromatic color having low brightness. In FIG. 16, the brightness of brightness and chromaticity separation signals is used to enter the vertical axis and the chroma calculated from the chromaticity is used to enter the horizontal axis; the solid line represents a record color reproduction area and a shaded portion is an area in which record color data other than India ink is set to 0. The half-tone image brightness range is converted so that the half-tone image enters the record color reproduction area for the brightness signal, then is smoothed by edge processing. At the time, in the color conversion table, conversion data in the range of brightness Lp or more in FIG. 16 is used for conversion to CMYK record color signals.

On the other hand, black character signal (□ in FIG. 16) is enhanced in brightness by edge processing and compressed in chroma (in the arrow direction in FIG. 16) at the same time. At the time, if a given or more brightness enhancement gain is taken, the brightness after enhancement becomes Lp or less. At the time, since record color data other than India ink is set to 0 in the color conversion table, complete India ink monochrome reproduction is carried out.

Thus, according to the invention, optimum brightness chroma conversion for half-tone images, black characters, and color characters is executed in the brightness range conversion and edge processing, then conversion to record color is executed so that reproduction in the vicinity of achromatic color becomes substantial India ink monochrome reproduction and that reproduction at a given chroma or more becomes 3-color reproduction within the range insuring faithful color reproduction. Black characters and half-tone images differ in color conversion table use area, enabling India ink monochrome reproduction of black characters without impairing faithful reproduction of half-tone images.

The above and other objects and features of the present invention will be more apparent from the following description taken in conjunction with the accompanying drawings.

DETAILED DESCRIPTION OF THE PREFERRED EMBODIMENTS

Figure 1:
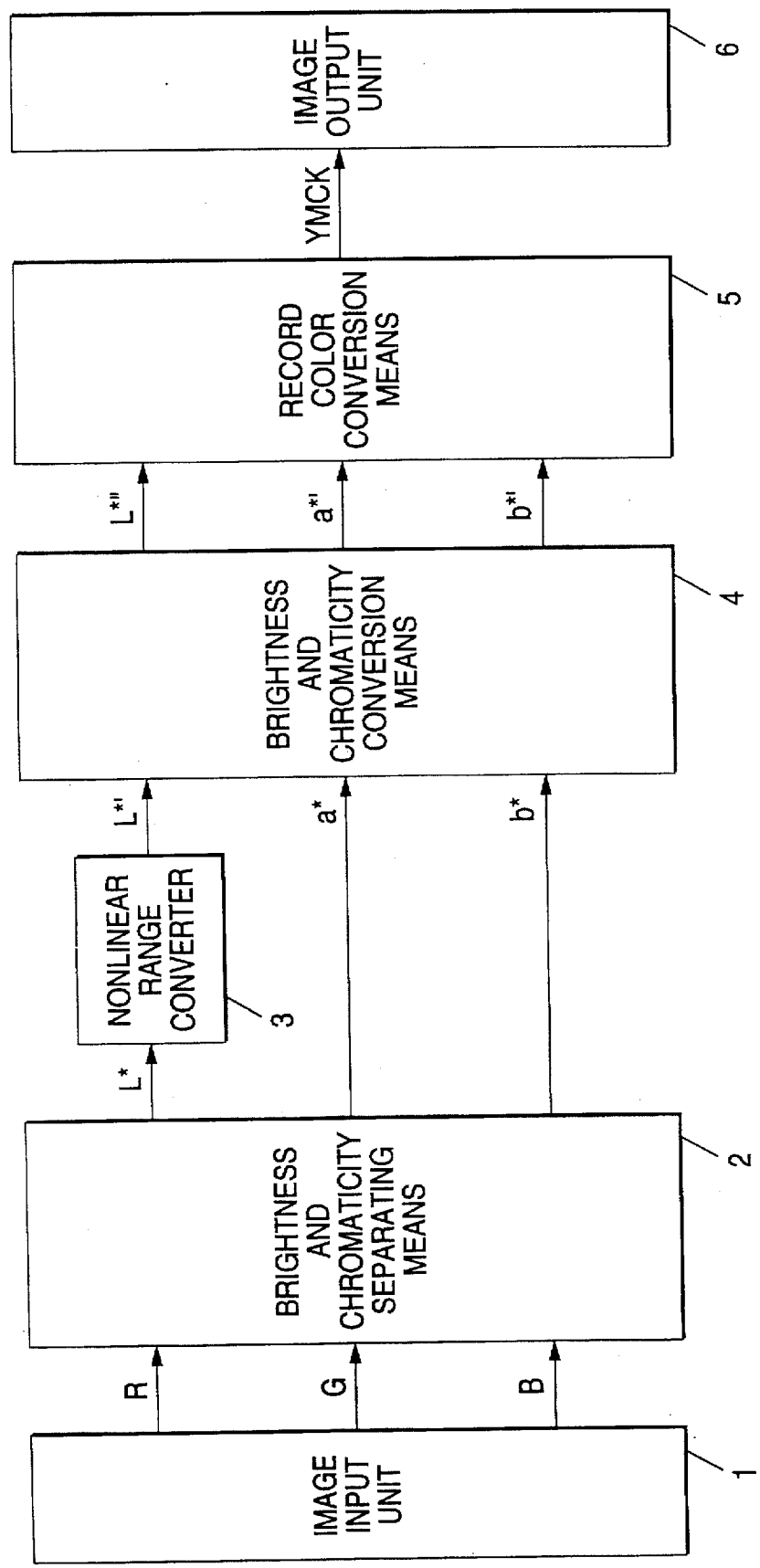
FIG. 1 is a general block diagram of one embodiment of a color image processing system of the invention.
Figure 2:
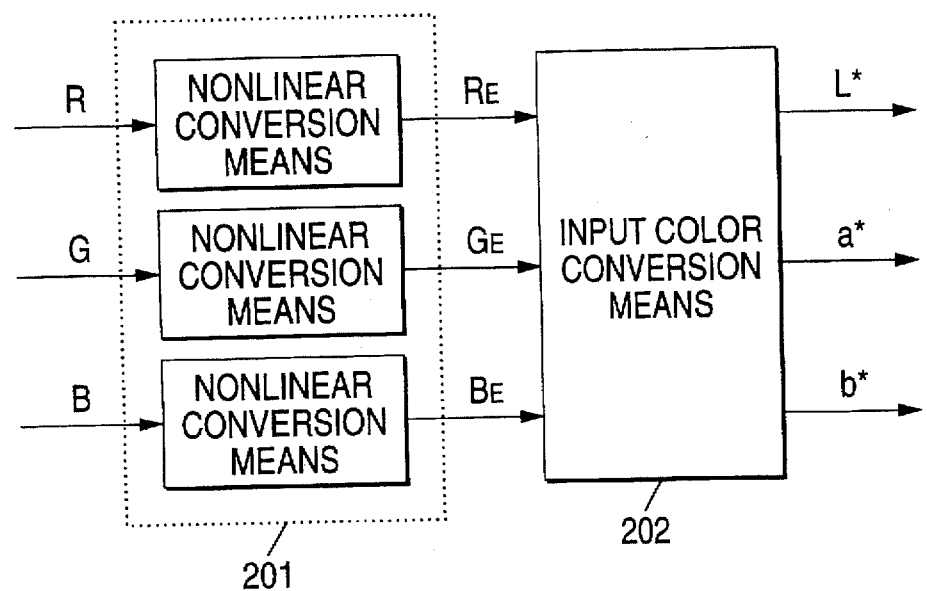
FIG. 2 is one example of the configuration of brightness and chromaticity separation means 2 in the embodiment.

Referring now to the accompanying drawings, there are shown preferred embodiments of the invention. FIG. 1 is a block diagram showing the configuration of one embodiment of a color image processing system of the invention, wherein numeral 1 is a color image input unit for separating a document information into three colors for read. The document information read by the image input unit 1 is converted into a digital signal by an A/D converter (not shown) provided in the image input unit 1, for example, and output as three color signals R, G, and B in parallel. The color signals R, G, and B are converted into equivalent neutral brightness signals $R_E$, $G_E$, and $B_E$ by brightness and chromaticity separation means 2, then converted into brightness and chromaticity separation coordinate system signals which are at an equal rate in perception and device-independent; color signals such as YIQ, Yxy, YES, L*u*v*, and L*a*b* fit into the signals. In the embodiment, L*a*b* is used as a typical example in the description to follow. To convert the input signal coordinate system {R, G, B} into {L*, a*, b*} color specification system, the following means can be taken: As a simple conventional method, both a lookup table and nonlinear masking technique are used. FIG. 2 shows the configuration of the brightness and chromaticity separation means 2. Input signals {R, G, B} through the input unit 1 are converted into equivalent neutral brightness signals $R_E$, $G_E$, and $B_E$ by nonlinear conversion means 201. The equivalent neutral brightness signals are signals which are at an equal rate with respect to the brightness (in this case, L*) and when $R_E$, $G_E$, and $B_E$ equal each other, reproduce gray. Such conversion is executed according to the following procedure:

1) Prepare a plurality of pure gray targets L*i with known brightness (in this case, L*) and read them by the image input unit 1 to provide input signals {Ri, Gi, Bi}; and 2) cycle the relationship between each of the input signals {Ri, Gi, Bi} and L*i and register the results in the nonlinear conversion means 201 as a lookup table.

Next, the equivalent neutral brightness signals $R_E$, $G_E$, and $B_E$ are converted into brightness and chromaticity separation coordinate system signals (in this case, L*a*b*) by input color conversion means 202. The conventional nonlinear masking technique can be applied to the input color conversion means 202. The conversion using the nonlinear masking technique is represented by the following general expression:

$$L^* = \psi 1(R_E, G_E, B_E, R_E G_E, G_E B_E, B_E R_E, R_E^2, G_E^2, B_E^2, \text{const}, \ldots)$$

$$a^* = \psi a(R_E, G_E, -B_E, R_E G_E, G_E B_E, B_E R_E, R_E^2, G_E^{-2}, B_E^2, \text{const}, \ldots)$$

$$b^* = \psi b(R_E, G_E, B_E, R_E G_E, G_E B_E, B_E R_E, R_E^2, G_E^2, B_E^2, \text{const}, \ldots)^+ \quad (6)$$

At the time, the conversion parameters are determined according to the following procedure:

1) Extract target colors {L*i, a*i, b*i} at an equal rate from uniform color space and read them by the input unit 1 to provide input signals {Ri, Gi+, Bi};

2) convert the input signals into the equivalent neutral brightness signals $R_E$, $G_E$, and $B_E$ by the nonlinear conversion means 201 already determined; and 3) approximate the relationship between the equivalent neutral brightness signals $R_E$, $G_E$, and $B_E$ and the target colors {L*i, a*i, b*i} by a least square method to provide the conversion parameters.

Generally, the extent to which nonlinear high-order terms of the input color conversion means 202 are required depends on the performance of the input unit 1. An input unit of a digital color copier can provide RMS color difference 5 by 3×4 matrix conversion using linear terms and constants or RMS color difference 2 or so by 3×10 matrix conversion containing also quadratic terms.

Figure 3:
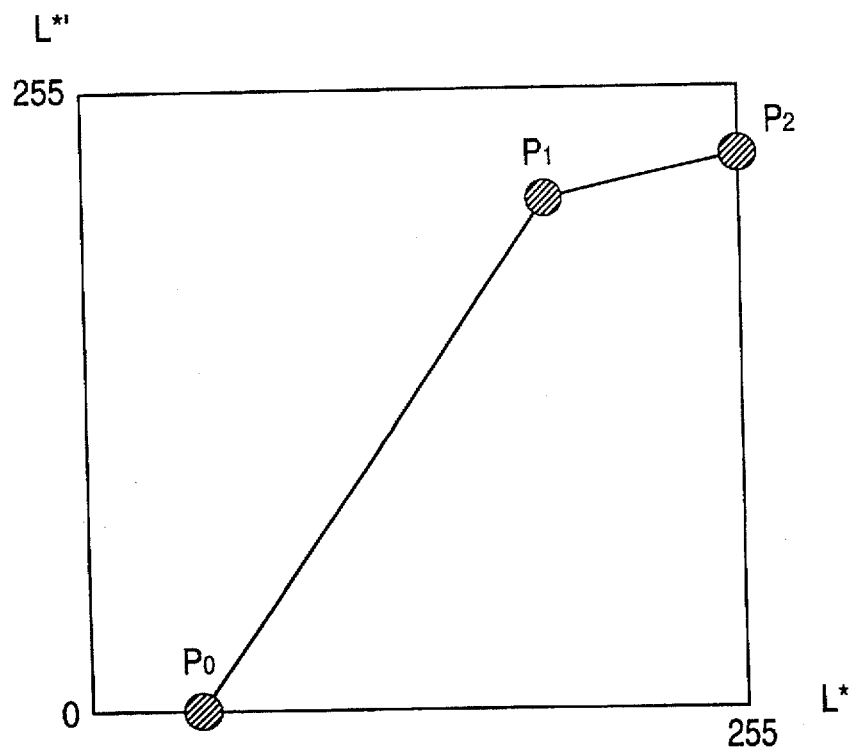
FIG. 3 is an illustration representing one example of a conversion characteristic at a nonlinear range converter 3 in the embodiment.

Next, the brightness signal L* output from the brightness and chromaticity separation means 2 is input to a nonlinear range conversion unit 3 which is controlled by three points $P_0$, $P_1$, and $P_2$ as shown in FIG. 3 and is formed as a lookup table. The point $P_0$ is a parameter for setting white points of an image and is used particularly when a document like photo with dark ground is processed. The points $P_1$ and $P_2$ are parameters for compressing the input lightness within the reproduction range of a recorder and have a function of compressing it while maintaining gradation. This function is required for separating a table use area of a record color converter 5 (described below) between character and half tone in a mode of outputting a mixture of character and half-tone images. In the embodiment, $P_0$=(0, 0), $P_1$=(185, 185), and $P_2$=(255, 240) are set. In the embodiment, an image reproduction mode can be selected with a selection button, etc., (not shown) among a character image reproduction mode, a half-tone image reproduction mode, and a character and half-tone image mixture reproduction mode. The invention is applied particularly in the character and half-tone image mixture reproduction mode.

Figure 4:
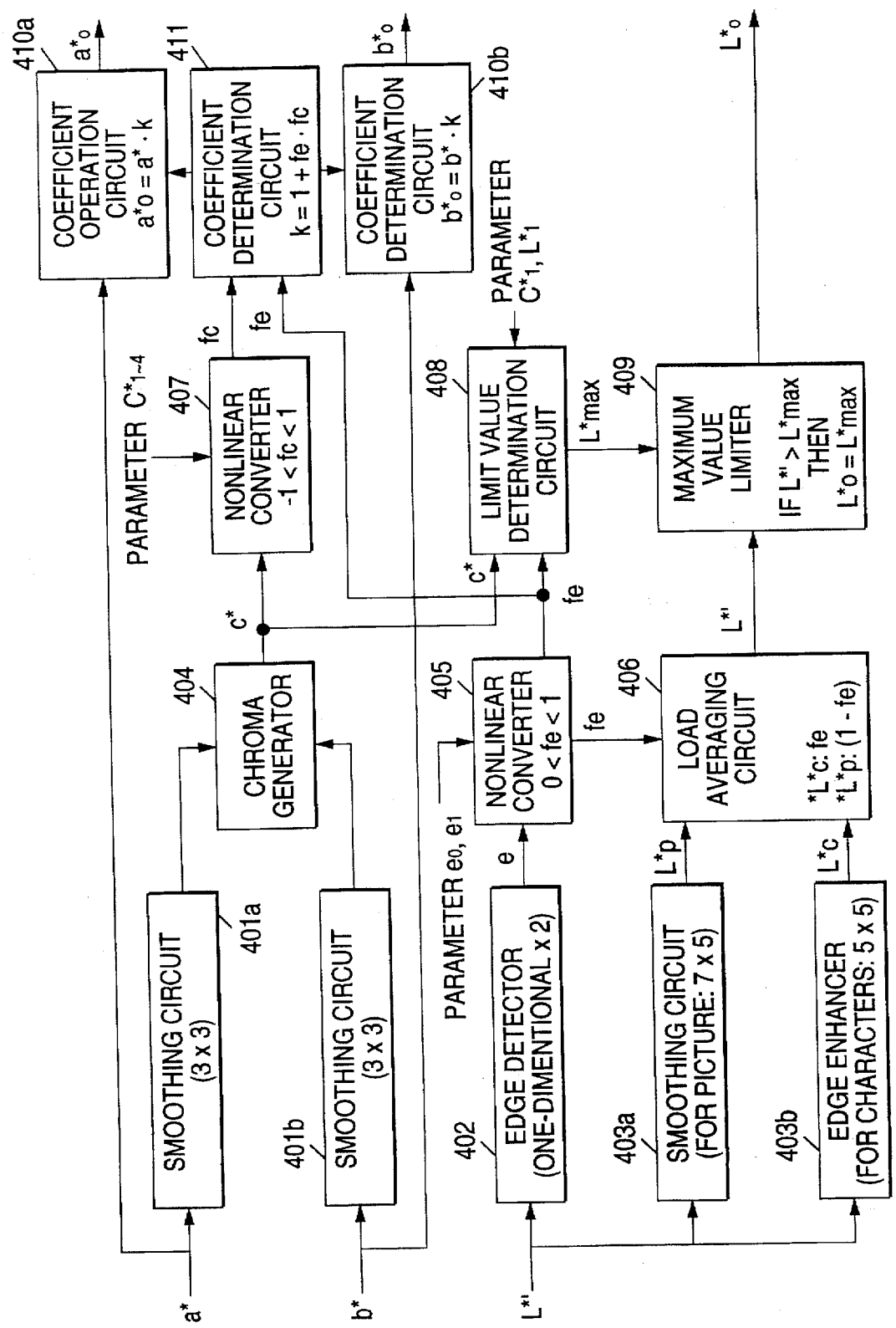
FIG. 4 is one example of the configuration of brightness and chromaticity conversion means 4 in the embodiment.

Next, output signal L*' from the nonlinear range converter 3 and chromaticity signals a* and b* are input to brightness and chromaticity conversion means 4. FIG. 4 is a detailed block diagram of the brightness and chromaticity conversion means 4. The operation of the brightness and chromaticity conversion means 4 will be discussed based on FIG. 4. The brightness signal L*' is input to an edge detector 402, a smoothing circuit 403a, and an edge enhancer 403b in parallel. On the other hand, the chromaticity signals a* and b* are input to smoothing circuits 401a and 401b in parallel. The edge detector 402 comprises two one-dimensional digital filters and outputs edge amount e of the brightness signal L*'. The edge amount e is input to a nonlinear converter 405, which then outputs an edge weight fe normalized between 0 and 1. On the other hand, smoothed chromaticity signals a'* and b'* output from the smoothing circuits 401a and 401b are input to a chroma generator 404, which then generates a chroma signal C* by conversion equivalent to the definition expression:

$$C^* = \{a'^{*2} + b'^{*2}\} \quad (7)$$

At the time, the chroma generator 404 may be made up of an multiplier and an adder or may be made of a lookup table. Thus, the edge weight fe and the chroma C* of the input signals L*, a*, and b* for the object pixel are calculated and the brightness and chromaticity separation signals are controlled by both the signals.

Figure 5:
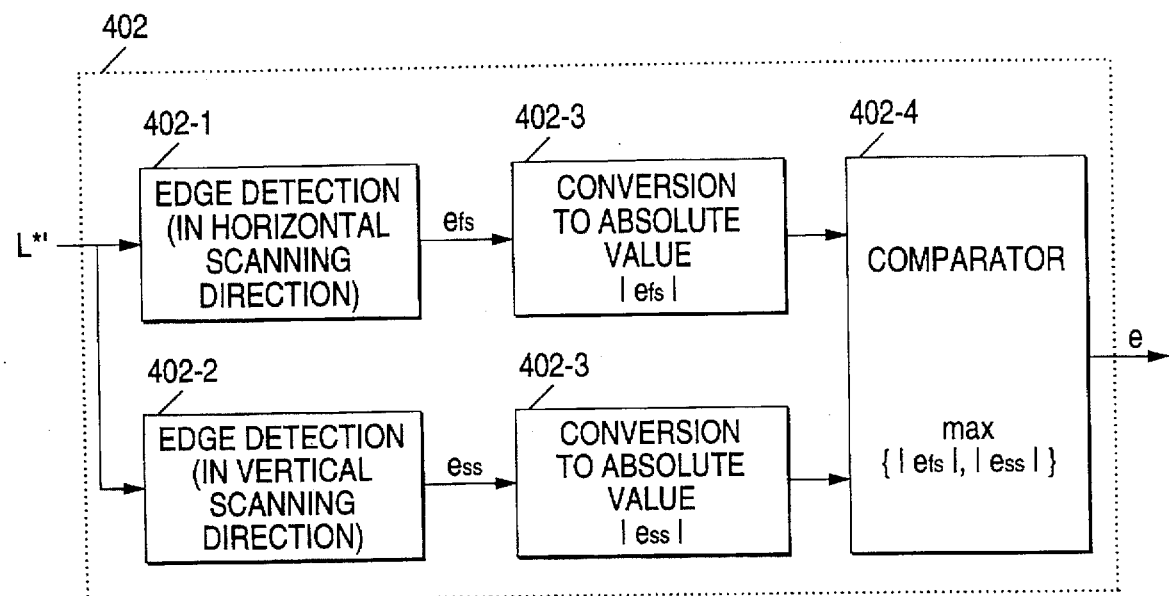
FIG. 5 is one example of the configuration of an edge detector 402 in brightness and chromaticity conversion means 4.

FIG. 5 shows details of a configuration example of the edge detector 402. The edge detector 402 comprises two digital filters 402-1 and 402-2 having detection sensitivity in horizontal and vertical scanning directions. The filter coefficient of the digital filter 402-1 is set to a value as shown in the following matrix:

| | | | | |
|---|---|---|---|---|
| −0.25 | 0 | 0.5 | 0 | −0.25 |
| −0.25 | 0 | 0.5 | 0 | −0.25 |
| −0.25 | 0 | 0.5 | 0 | −0.25 |
| −0.25 | 0 | 0.5 | 0 | −0.25 |
| −0.25 | 0 | 0.5 | 0 | −0.25 |

The filter coefficient of the digital filter 402-2 is set to a value as shown in the following matrix:

| | | | | |
|---|---|---|---|---|
| −0.25 | −0.25 | −0.25 | −0.25 | −0.25 |
| 0 | 0 | 0 | 0 | 0 |
| 0.50 | 0.50 | 0.50 | 0.50 | 0.50 |
| 0 | 0 | 0 | 0 | 0 |
| −0.25 | −0.25 | −0.25 | −0.25 | −0.25 |

Digital filter outputs of both the filters, $e_{fs}$ and $e_{ss}$, are passed through a converter to absolute value 402-3, then input to a comparator 402-4, which then outputs the greater value as the edge amount e. At the time, the digital filter coefficients are designed so as to provide the maximum detection sensitivity at 41 p/mm with 400-dpi data, and special emphasis is placed on edge detection of 8-point or less characters. Each of the digital filters has the maximum detection sensitivity at 41 p/mm in one direction and produces the averaging effect in another direction, thus has the effect of suppressing the edge amount of a half-tone dot print image having two-dimensional edge distribution and further widens edge detection latitude of fine characters and half-tone dot print images by maximum value selection at the comparator 402-4.

Figure 6:
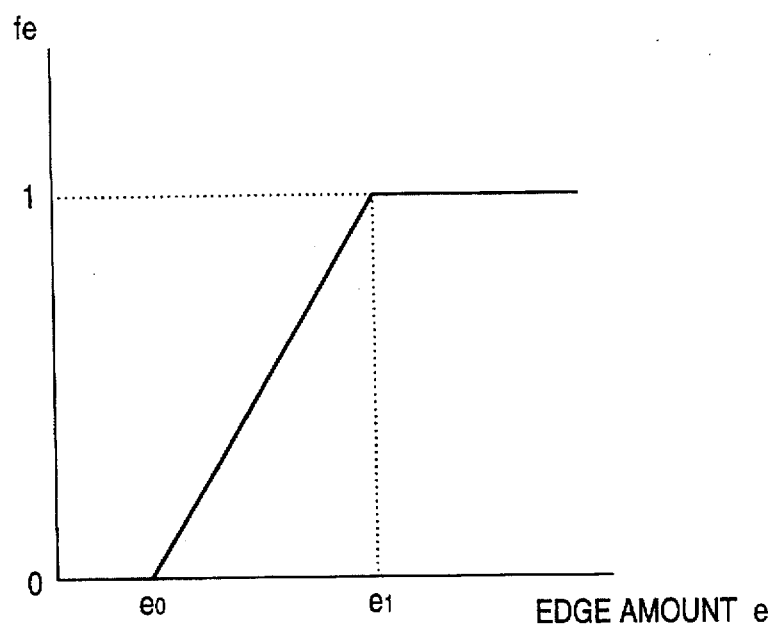
FIG. 6 is an illustration representing one example of a conversion characteristic of a nonlinear converter 405 in the brightness and chromaticity conversion means 4.

FIG. 6 shows a conversion characteristic of the nonlinear converter 405 of the edge amount e. The conversion characteristic of the nonlinear converter 405 is determined by parameters $e_0$ and $e_1$ that can be set from the outside; in the embodiment, $e_0$ is set to 0 and $e_1$ is set to 100. At the time, preferably the distance between $e_0$ and $e_1$ is enlarged as much as possible to prevent an unnatural defect of an output image from occurring, and its setting depends on the configuration of the edge detector 402 and setup parameters. In the embodiment, the distance between $e_0$ and $e_1$ can be enlarged to a sufficiently problemless range by configuring the edge detector 402 as described above.

The smoothing circuits 401a and 401b of the chromaticity signals a* and b* are not necessarily required. However, if position shift for each scan and bad RGB balance of MTF are known at the input device, the smoothing circuits are required. The embodiment uses smoothing filter equal in horizontal and vertical scanning directions as shown below:

| | | |
|---|---|---|
| 0 | 0.125 | 0 |
| 0.125 | 0.5 | 0.125 |
| 0 | 0.125 | 0 |

Figure 7:
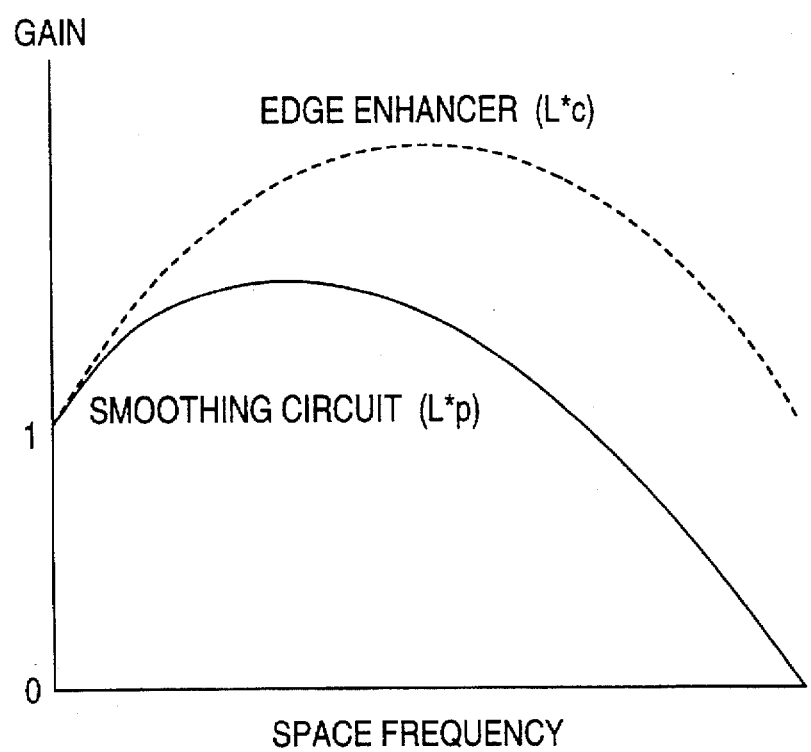
FIG. 7 is an illustration representing one example of space frequency characteristics of a brightness signal smoothing circuit 403a and a brightness signal edge enhancer 403b in the brightness and chromaticity conversion means 4.

Next, conversion of the brightness signal L*' using the edge weight fe and the chroma C* will be discussed. The brightness signal L*' is input to the smoothing circuit 403a and the edge enhancer 403b as well as the edge detector 402 in parallel. Each of the smoothing circuit 403a and the edge enhancer 403b is made of a two-dimensional digital filter of phase save type. The smoothing circuit 403a is designed to have a space frequency characteristic having a peak almost at 21 p/mm and a gain sufficiently dropping at 41 p/mm or more so that moire does not occur for half-tone dot image input either; in the embodiment, the smoothing circuit of 5×5 size is used. The edge enhancer 403b is designed to have a characteristic having a peak at 41 p/mm so that mainly 8-point or less characters can be enhanced sufficiently; in the embodiment, the edge enhancer of 7×5 size is used. FIG. 7 shows an example of the space frequency characteristics of the filters. Two types of space frequency conversion as shown in FIG. 7 are executed, whereby an output appropriate for reproducing a half-tone image (L*p) is provided from the smoothing circuit 403a and an output appropriate for reproducing a character image (L*c) is provided from the edge enhancer 403b. The output signals of both the filters and the edge weight fe are input to a load averaging circuit 406, which then mixes both the output signals according to the edge weight fe and outputs a mixed signal L*' in the following expression:

$$L^{*'} = fe \cdot L^*c + (1-fe) \cdot L^*p \tag{8}$$

As seen from the expression (8), for a half-tone image having small edge weight fe, the mixed signal L*' almost equals L*p and an optimum signal for the half-tone image is output. For a character image having large edge weight fe, the mixed signal L*' almost equals L*c and an optimum signal for the character image is output. Since the edge weight fe is a continuous amount, output continuously changes with the edge amount transition and an unnatural defect on a reproduced image as in the conventional example does not appear.

Figure 8:
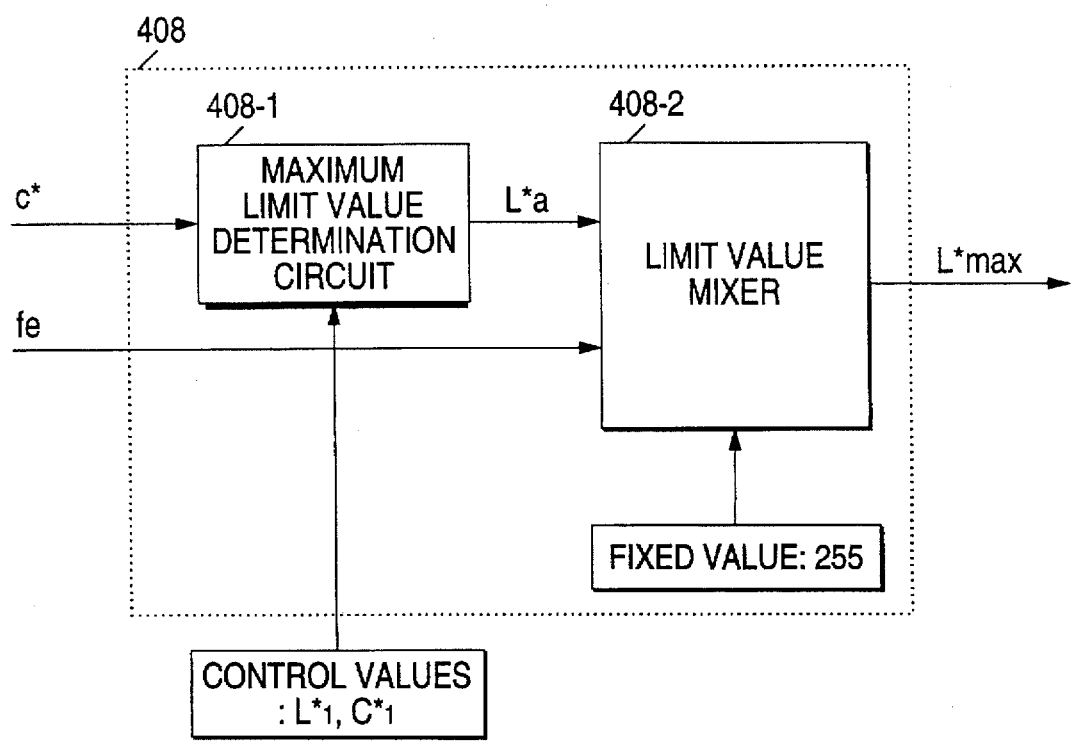
FIG. 8 is one example of the configuration of a brightness signal limit value determination circuit 408 in the brightness and chromaticity conversion means 4.
Figure 9:
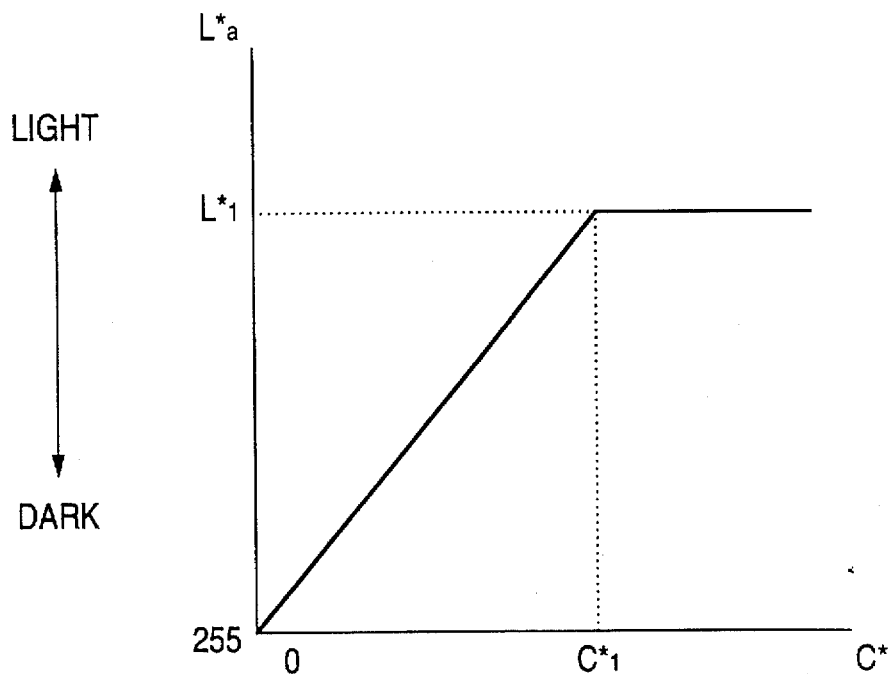
FIG. 9 is an illustration representing one example of a characteristic of a maximum limit value determination circuit 408-1 (FIG. 8), a part of the brightness signal limit value determination circuit 408 in the brightness and chromaticity conversion means 4.

Next, the mixed signal L*' is limited by a limit value L*max determined from the edge weight fe and the chromaticity signal C*. This process will be discussed with reference to FIGS. 8 and 9. FIG. 8 is a detailed block diagram of a limit value determination circuit 408 in FIG. 4. In FIG. 8, the chromaticity signal C* is input to a maximum limit value determination circuit 408-1, which then outputs a maximum limit value L*a. The relationship between the maximum limit value L*a and the chromaticity signal C* is as follows: As the chroma increases, the maximum limit value L*a changes linearly to a light value and when the chroma exceeds a given value $C^*_1$, is fixed to $L^*_1$, as shown in FIG. 9. At the time, $(C^*_1, L^*_1)$ are set changeably from the outside; in the embodiment, (50, 100) are used. The maximum limit value determination circuit 408-1 may be made up of a combination of a multiplier and a limiter or may be made of a lookup table. Next, the maximum limit value L*a and the edge weight fe are input to a limit value mixer 408-2, which then calculates a limit value L*max in the following expression:

$$L^*max = fe \cdot L^*a + (1-fe) \cdot 255 \tag{9}$$

In expression (9), the fixed value 255 is a maximum brightness value that can be taken when no limitation is placed. The limit value mixer 408-2 may be made up of a combination of a multiplier and a limiter or may be made of a lookup table. Thus, the limit value determination circuit 408 outputs the limit value L*max determined from the edge weight fe and the chroma signal C*. For a half-tone image with small edge weight fe, L*max becomes 255 and the limit value does not work. For a character image with large edge weight fe, the limit value L*max changes with the chroma signal C* of the pixel. In the setting in FIG. 9, as the chroma increases, the limit value L*max changes linearly to a light value. That is, the function limits brightness enhancement for color characters with large edge weight fe and high chroma. Next, the mixed signal L*' and the limit value L*max are input to a maximum value limiter 409, which then outputs a brightness conversion signal L*o limited by the limit value L*max as in the following expression:

IF $L^{*'} > L^*$max THEN $L^*o = L^*$max

ELSE IF $L^{*'} \leq L^*$max THEN $L^*o = L^{*'}$ \qquad (10)

Such conversion can prevent unnecessary colors from mixing with color characters.

Figure 10:
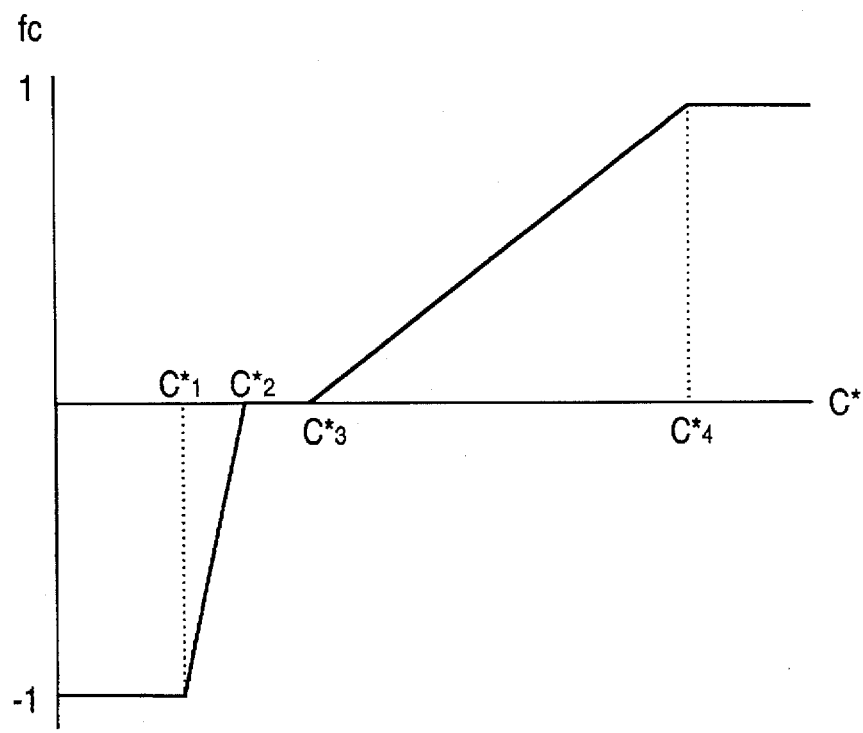
FIG. 10 is an illustration representing one example of a conversion characteristic of a chroma signal nonlinear converter 407 in the brightness and chromaticity conversion means 4.

Next, conversion of the chromaticity signals a* and b* will be discussed. The chroma signal C* is input to a nonlinear converter 407 for converting the signal into a chroma conversion signal fc normalized between −1 and 1. FIG. 10 shows an example of the conversion to the signal fc. The conversion is controlled by four parameters $C^*_1$ to $C^*_4$; $C^*_1$ denotes the upper limit value of C* for conversion to fc=−1, $C^*_2$ denotes the lower limit value of C* for conversion to fc=0, $C^*_3$ denotes the upper limit value of C* for conversion to fc=0, and $C^*_4$ denotes the lower limit value of C* for conversion to fc=1. These are set changeably from the outside; in the embodiment, they are set to (10, 15, 20, 50). Such a nonlinear converter 407 can be made of a lookup table. The edge weight fe and the chroma conversion signal fc are input to a coefficient determination circuit 411, which then calculates a coefficient k according to the following expression:

$$k = 1 + fe \cdot fc \tag{11}$$

The coefficient determination circuit 411 can be made up of a combination of a multiplier and an adder. The coefficient k becomes substantially 1 for a half-tone image with small edge weight fe, substantially 0 for a black character with large edge weight fe and low chroma, or substantially 2 for a color character with large edge fe and high chroma. The coefficient k is operated on the chromaticity signals a* and b* of the object pixel by coefficient operation circuits 410a and 410b for conversion to a*o and b*o as shown in the following expression:

$$a^*o = a^* \cdot k \quad b^*o = b^* \cdot K \tag{12}$$

Therefore, the input chromaticity signals a* and b* are output without being subjected to conversion for a half-tone image or are compressed in chroma and become achromatic for a black character. For a color character, chroma enhancement different in degree depending on the original chroma is operated and enhancement is made twice at the maximum.

Figure 17:
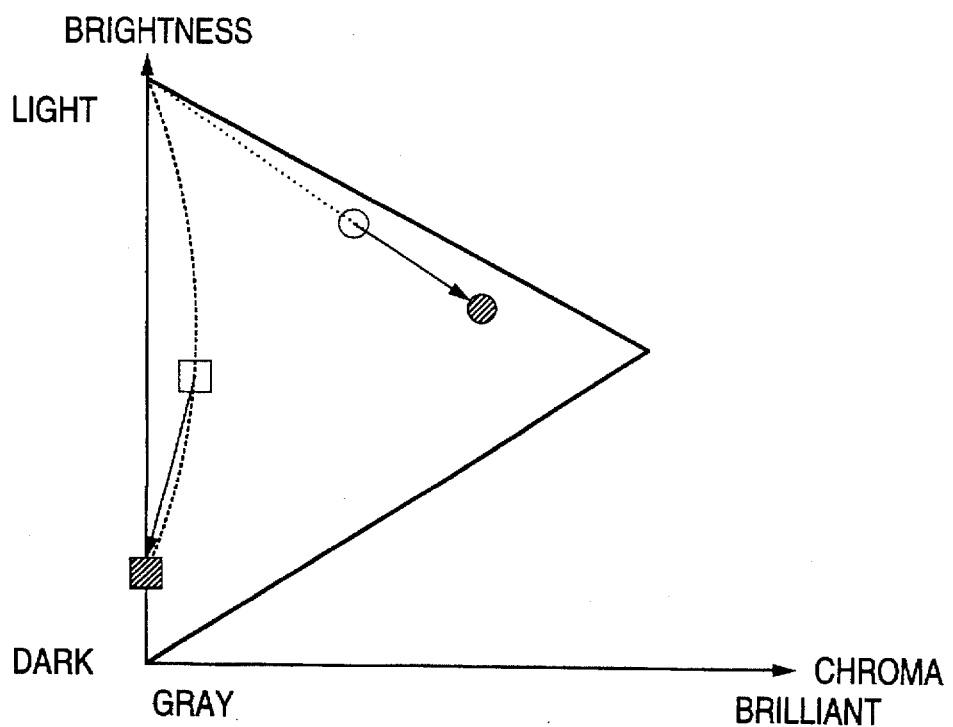
FIG. 17 is an illustration explaining change for a document of black character and color character signals input through an image input unit.
Figure 18:
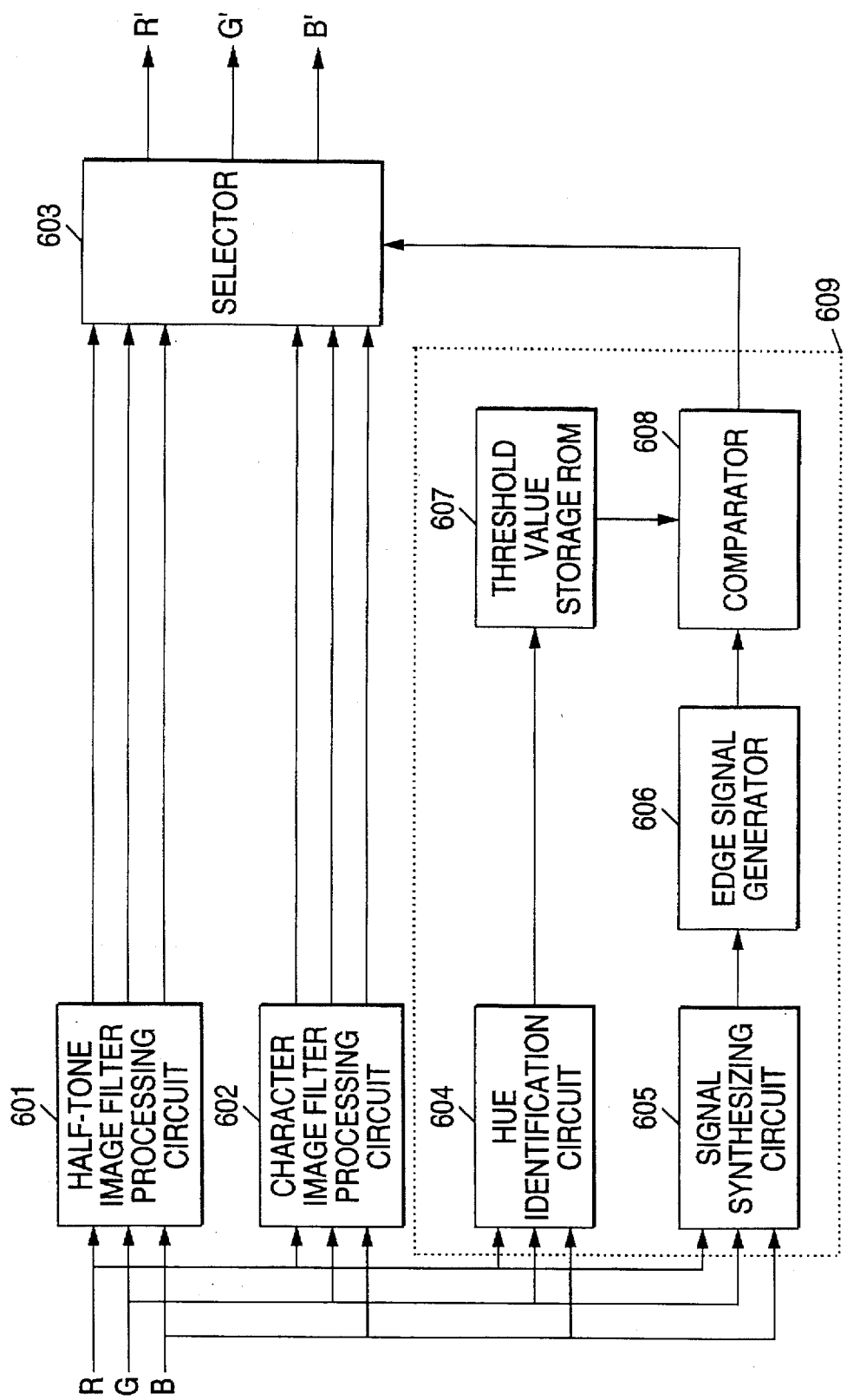
FIG. 18 is a configuration example of a conventional edge processing system of character and half-tone image separation type.

In the steps, the brightness and chromaticity conversion means 4 suppresses an increase in noise of a half-tone image caused by edge enhancement processing and gives visually natural edge enhancement, preventing an unnatural image defect from occurring. The edge enhancement amount can be set in a simple form. The brightness and chroma are controlled so that character signals after edge enhancement reproduce black characters achromatically and color characters at the original chroma, and the input chromaticity in FIG. 17 can be made to approach the original document chromaticity.

Figure 11:
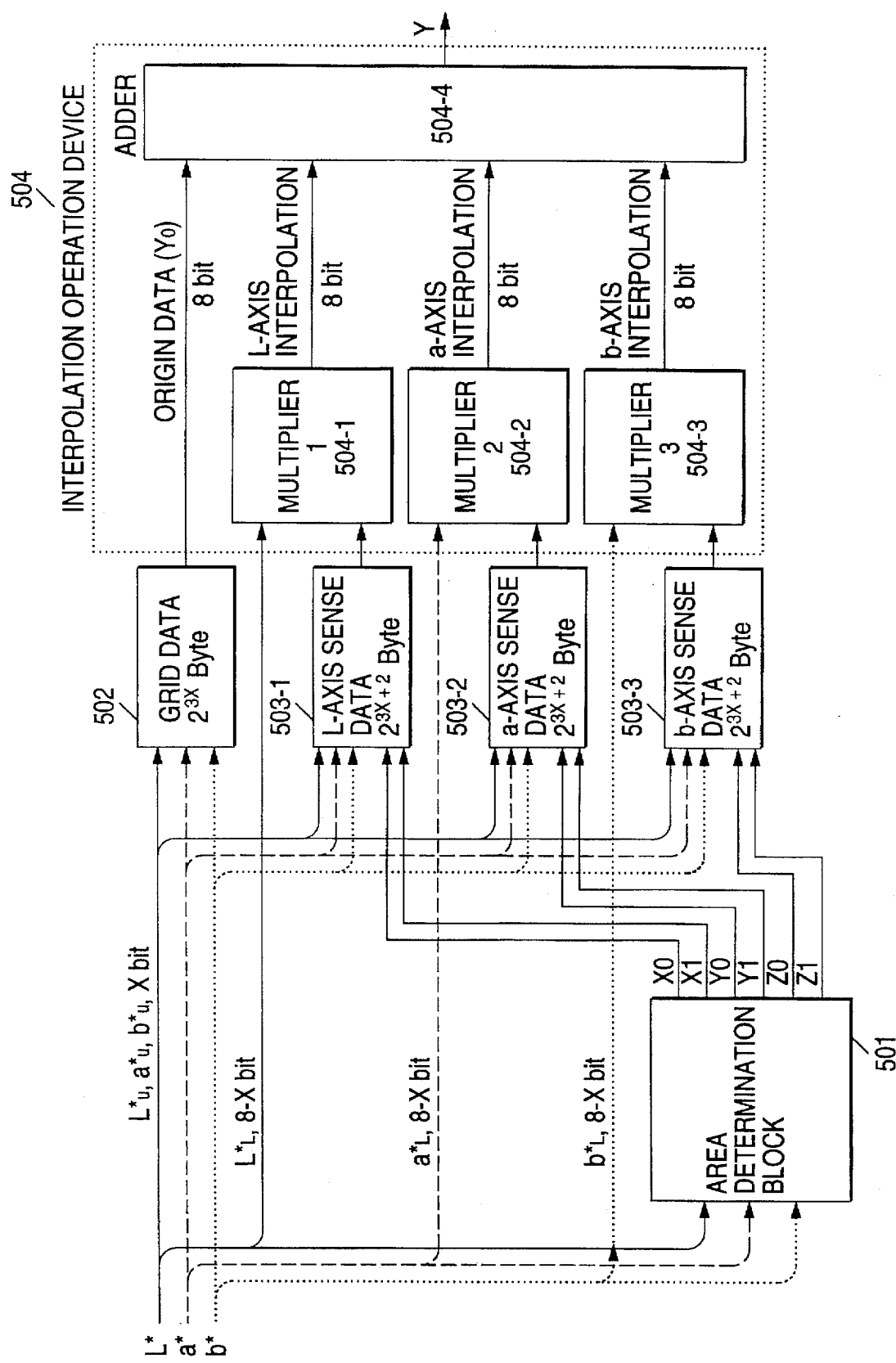
FIG. 11 is one example of the configuration of record color conversion means 5.

The brightness and chromaticity separation signals thus converted by the brightness and chromaticity conversion means 4 are converted into record color signals CMYK by the record color conversion means 5. FIG. 11 shows a configuration example of the record color conversion means 5. The example uses the art disclosed in Japanese Patent Laid-Open No. Hei 5-110840 related to the application of the present applicant. The record color conversion means 5 comprises a record color data hold section 502 for using data of predetermined high-order bits (Lu, au, bu) of each brightness and chromaticity separation signal as an address and holding record color data corresponding to it, an area determination section 501 for determining an area from low-order bit (P-Lu, P-au, P-bu) data L*L, a*L, b*L, sensitivity data hold sections 503-1, 503-2, and 503-3 for using the high-order bit (LU, au, bu) data and the area determination result as an address and holding the sensitivity corresponding to it, multipliers 504-1, 504-2, and 504-3 for multiplying the low-order bit (P-Lu, P-au, P-bu) data by the sensitivity data, and an adder 504-4 for adding outputs of the multipliers 504 and an output of the record color data hold section 502.

Figure 12:
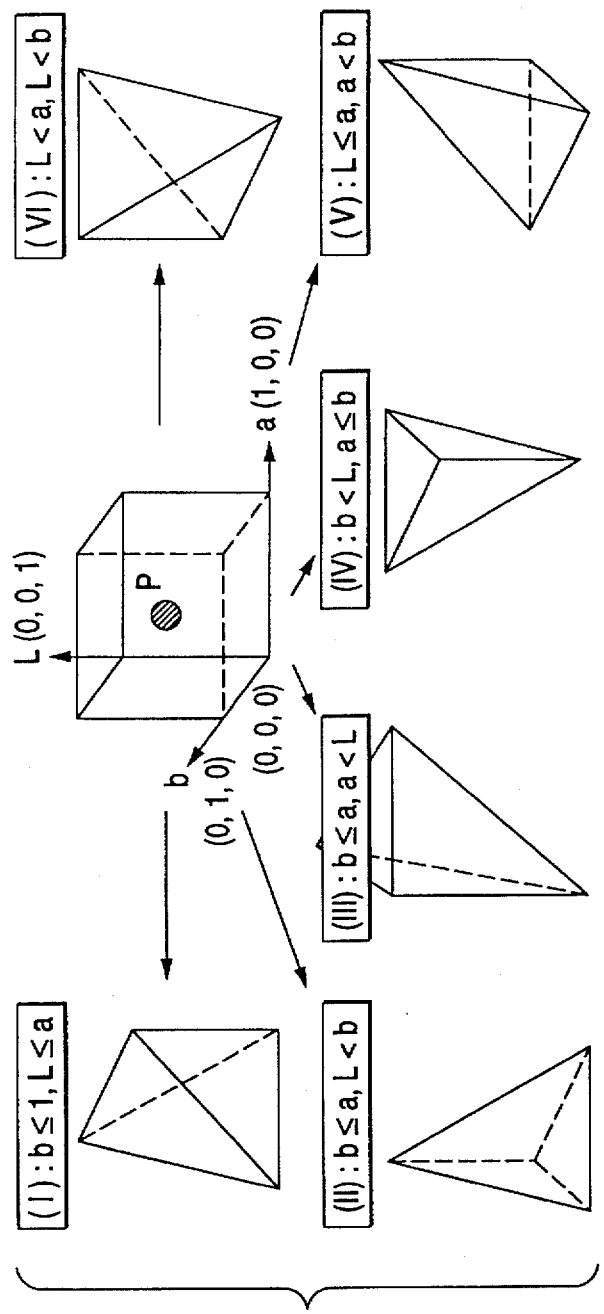
FIGS. 12(a) and 12(b) are illustrations explaining area division performed in the record color conversion means 5.

When eight bits of each of the brightness and chromaticity separation signals L*, a*, and b* are represented, the brightness and chromaticity separation signals L*, a*, and b* are divided into high-order X bits and low-order 8-X bits and input to the record color conversion means 5. When the high-order bits of the object pixel is (Lu, au, bu), the record color data hold section 502 outputs record color data Y0 by using (Lu, au, bu) as the address. On the other hand, the low-order 8-X bits are input to the area determination section 501, which then compares their greater than, equal to, or less than relationships and outputs six bits of sensitivity flags for selecting the sensitivity. The state will be described with reference to FIGS. 12(a) and 12(b). The cube in FIG. 12(a) is a cube in the minimum unit put by lattice points of the record color data hold section 502. Assuming that the low-order bit (P-Lu, P-au, P-bu) data is $L^*_L$, $a^*_L$, $b^*_L$, interpolation operation is performed according to the following expression:

$$Y = Y_0 + \partial Y/\partial L^* \cdot XL^*_L + \partial Y/\partial a^* \cdot Xa^*_L + \partial Y/\partial b^* \cdot Xb^*_L \quad (13)$$

At the time, the differential coefficients are represented by the data difference in a specific direction of each cube. For example, as $\partial Y/\partial L^*$, the following four ways are possible at the cube in FIG. 12 (a):

```
X (0, 0, 1) - X (0, 0, 0)
X (1, 0, 1) - X (1, 0, 0)
X (0, 1, 1) - X (0, 1, 0)
X (1, 1, 1) - X (1, 1, 0)
```

Thus, the cube is divided into four areas (I) to (VI) from the greater than, equal to, or less than relationships among the low-order bits as in FIG. 12(a), and which of the four is used as the differential coefficient is determined. Therefore, as in a table in FIG. 12(b), one of four can be selected with a 2-bit selection flag for each of the differential coefficients $\partial Y/\partial L^*$, $\partial Y/\partial a^*$, and $\partial Y/\partial b^*$ in three directions by comparing the greater than, equal to, or less than relationships among the low-order bits.

Thus, the two bits of sensitivity flag generated by the area determination section 501 and the high-order bits of the object pixel are input to the sensitivity data hold sections 503-1, 503-2, and 503-3, and $\partial Y/\partial L^*$, $\partial Y/\partial a^*$, and $\partial Y/\partial b^*$ with the bits as address are read. $Y_0$ output from the record color hold section 502, $\partial Y/\partial L^*$, $\partial Y/\partial a^*$, and $\partial Y/\partial b^*$ output by the sensitivity data hold sections 503-1, 503-2, and 503-3, and the low-order bit (P-Lu, P-au, P-bu) data $L^*_L$, $a^*_L$, and $b^*_L$ are input to an interpolation operation device 504, which then performs operation on them according to expression (11) and outputs Y to an image output unit 6. Assuming an image output unit for executing a normal 4-cycle recording process in order for recording, output data is transmitted to the image output unit 6, for example, in the order of K, Y, M, and C according to the recording order. At the time, the contents of the record color hold section 502 and the sensitivity data hold sections 503-1, 503-2, and 503-3 are rewritten in the blanking period of transmission.

Next, a determination method of YMCK data in the record color data hold section 502 will be described. Determination of the data first requires modeling of an IN-OUT characteristic of the image output unit 6, next requires a control method of one freedom degree at three inputs of brightness and chromaticity separation signals and four outputs of record color signals.

First, the IN-OUT characteristic of the image output unit 6 is discussed. A combination of nonlinear regression and computer color matching techniques, an optimization technique using a neural network, etc., can be applied as modeling techniques. In the embodiment, the optimization technique using a neural network is discussed to explain the modeling. Generally, a back propagation method known as a neural circuit theory can be used. In the back propagation method, a desired output for an input is previously given as a teacher signal, a signal resulting from function conversion of the difference between the actual output and the teacher signal is used as energy, and the weight value and threshold value of each neuron are changed until the energy decreases to 0 or becomes saturated at a predetermined output set. The energy is a function of each weight value and threshold value and all steps of the conversion process comprise continuous function and multiplication and addition, thus energy function can be differentiated with each weight value and threshold value as variables. The differential function is used to change each weight value and threshold value so as to decrease the energy function, whereby the energy function can be decreased.

Figure 13:
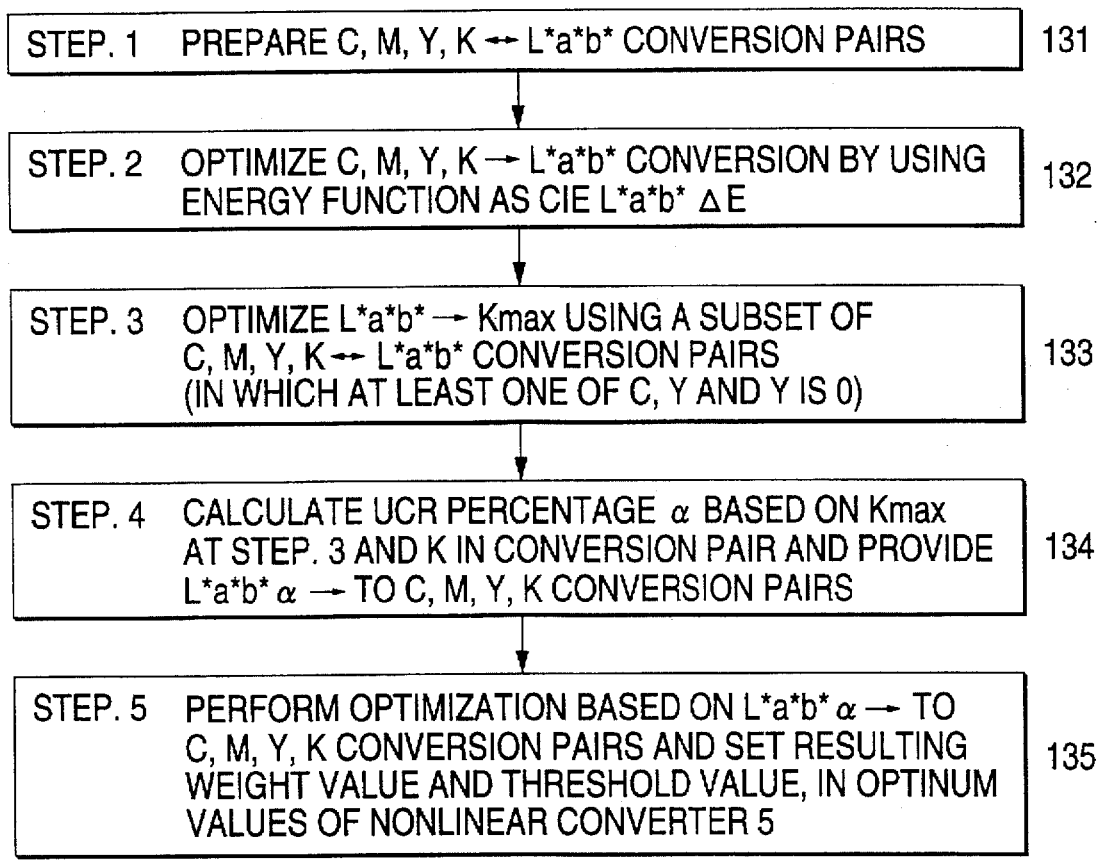
FIG. 13 is a flowchart representing a modeling procedure of an output unit at the preparation stage of the color conversion table contents in the record color conversion means 5.

Next, an optimization procedure in the invention will be discussed with reference to FIG. 13.

Step 1: C, M, Y, K—L*a*b* conversion pairs are prepared. Known four color record color signals (C, M, Y, and K) are supplied to the target recorder for providing an actual color print sample and the sample colors are measured with a commercially available colorimeter or the input device in the invention to provide L*, a*, and b* signals. N pairs of them, for example, N=$P^4$ pairs, are prepared considering the nonlinear characteristic of the recorder.

Step 2: C, M, Y, K to L*a*b* conversion is optimized with the energy function as CIE L*a*b* ΔE. Optimization is performed by the back propagation method using C, M, Y, K as input and L*a*b* color measurement values as output teacher signals in the N conversion pairs provided at step 1. At the time, the energy function E is defined according to the following expression (14) using CIE L*a*b* ΔE:

$$E = \Sigma\{(L^*-L^{*'})^2 + (a^*-a^{*'})^2 + (b^*-b^{*'})^2\}^{1/2} \quad (14)$$

where L*', a*', and b*' are predicted output values.

Step 3: A subset of C, M, Y, K—L*a*b* conversion pairs is used to optimize L*a*b*→Kmax. Only C, M, Y, K L*a*b* conversion pairs provided at step 1 in which at least one of C, M, and Y is 0 are extracted to provide a subset. In this subset, optimization is performed by the back propagation method using L*a*b* as input and K signals as output teacher signals. Since all the K signals in the subset are signals in reproduction at UCR percentage 100%, the conversion will provide the maximum value K max of the K signals that can be set while saving the given L*a*b* signals as color measurement. At the time, the energy function E is defined according to the following expression:

$$E = \Sigma\{Kmax - Kmax'\}^2 \quad (15)$$

where Kmax is a predicted output value.

Step 4: UCR percentage α is calculated based on Kmax provided at step 3 and K in the conversation pair at step 1 and L*a*b*α to C, M, Y, K conversion is optimized. First, the optimum conversion obtained at step 3 is used for L*a*b* to provide Kmax. On the other hand, K signal of C, M, Y, K of L*a*b* conversion pair is referenced and the UCR percentage α is calculated according to the following expression:

$$\alpha = K/K\max \qquad (16)$$

This operation is applied to all N conversion pairs prepared at step 1, thereby forming new L*a*b*α and C, M, Y, K conversion pairs.

Step 5: Optimization is performed based on the L*a*b*α to C, M, Y, K conversion pairs and the resulting weight value and threshold value are set in the optimum values of the neural network. Optimization is performed by the back propagation method using L*a*b*α as input and C, M, Y, K as output teacher signals. At the time, predicted values C', M', Y', and K' of C, M, Y, and K are once converted into L*'a*'b*' by the C, M, Y, K to L*a*b* optimum conversion executed at step 2, then evaluated with expression (14). As a result, the optimum weight value and threshold value minimizing the energy function E in expression (14) are set in the optimum values of the neural network.

By executing the steps, the weight value and threshold value of the neural network are determined and if the brightness and chromaticity separation signals L*a*b* and UCR percentage α are input, their corresponding record color signal YMCK optimum values are determined uniquely. Thus, the modeling of the IN-OUT characteristic of the image output unit 6 is completed.

Figure 14:
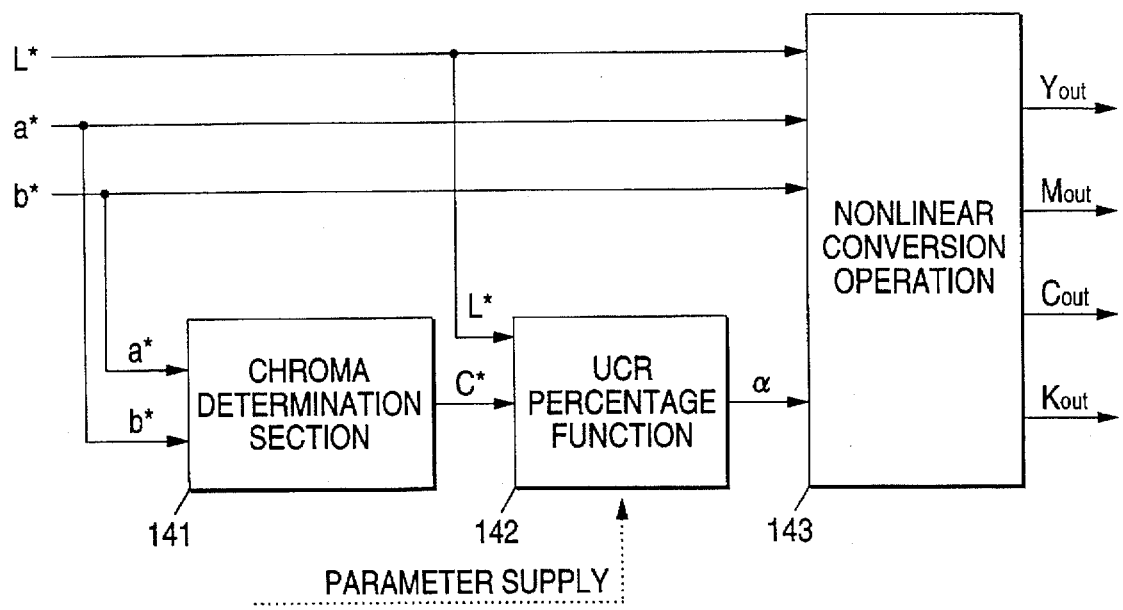
FIG. 14 is an illustration representing a preparation flow at the preparation stage of the color conversion table contents in the record color conversion means 5.
Figure 15:
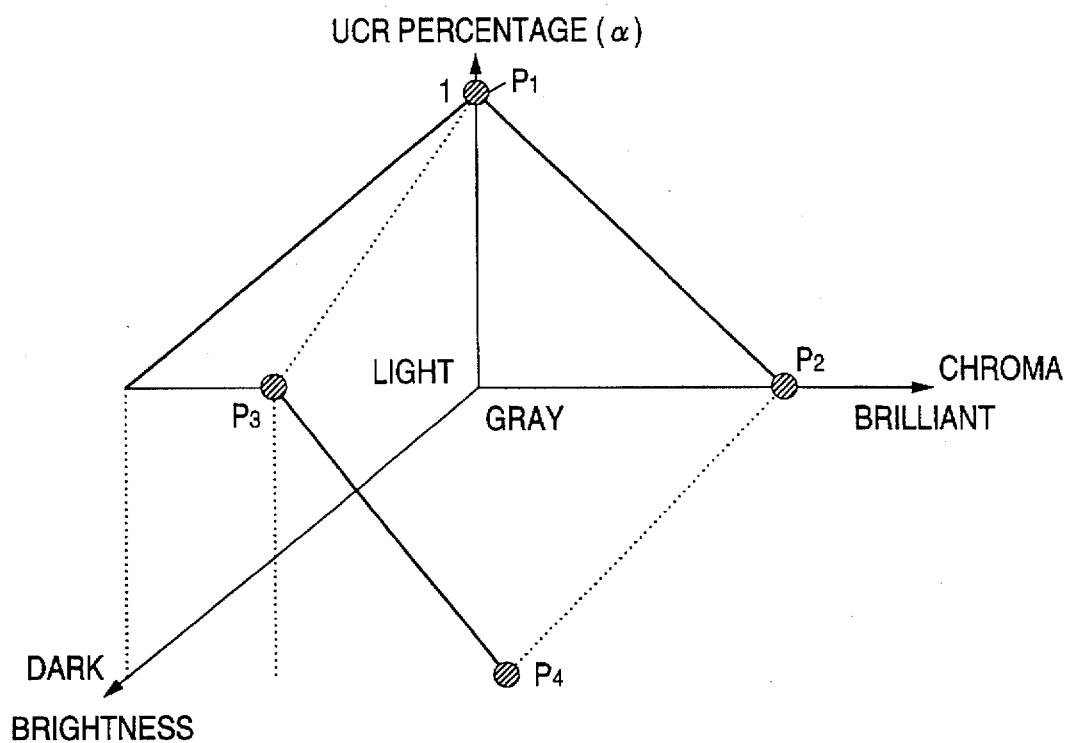
FIG. 15 is an illustration representing one setting example of a UCR percentage function 142.

Next, a YMCK data determination method example of the record color data hold section 502 using the above-mentioned model will be discussed with reference to FIG. 14. The determination method is disclosed in Japanese Patent Application No. Hei 5-248475 "Color Image Processing Method and System" previously filed by the applicant. Data corresponding to lattice points of the record color data hold section 502 is given as the brightness and chromaticity separation signals L*, a*, and b*. Using the chromaticity signals a* and b*, the chroma signal C* is determined from definition expression (7). The brightness L* and the chroma C* are input to a UCR percentage function 142. The characteristic of the UCR percentage function is controlled by four points on a brightness-chroma plane ($P_1$, $P_2$, $P_3$, and $P_4$), as shown in FIG. 15. $P_1$ and $P_2$ give ($C^*_1$, $\alpha_1$) and ($C^*_2$, $\alpha_2$) at brightness $L^*_1$. $P_3$ and $P_4$ give ($C^*_3$, $\alpha_3$) and ($C^*_4$, $\alpha_4$) at brightness $L^*_2$. In the embodiment, the following values are used for the reproducing mode of character and half-tone images:

| | |
|---|---|
| $L^*_1 = 95$ | |
| $C^*_1 = 0$ | $\alpha_1 = 1$ |
| $C^*_2 = 40$ | $\alpha_2 = 0$ |
| $L^*_2 = 30$ | |
| $C^*_3 = 20$ | $\alpha_3 = 1$ |
| $C^*_4 = 40$ | $\alpha_4 = 0$ |

That is, in this setting, the UCR percentage becomes 100% in the vicinity of achromatic color and becomes 0% at a given chroma or more. This means that reproduction in the vicinity of achromatic color becomes substantial India ink monochrome reproduction and that reproduction at a given chroma or more becomes 3-color reproduction. The chroma area with UCR percentage 100% enlarges as the brightness lowers, and particularly importance is given to Indian ink monochrome reproduction in a high-density gray portion.

On the other hand, the following values are used for the reproducing mode of only half-tone images:

| | |
|---|---|
| $L^*_1 = 95$ | |
| $C^*_1 = 0$ | $\alpha_1 = 0.7$ |
| $C^*_2 = 40$ | $\alpha_2 = 0$ |
| $L^*_2 = 30$ | |
| $C^*_3 = 0$ | $\alpha_3 = 0.7$ |
| $C^*_4 = 40$ | $\alpha_4 = 0$ |

That is, this setting is intended for reproduction similar to the conventional skeleton black technique so as to lessen change among C, M, Y, and K with chroma change. Thus, the UCR percentage α for the input brightness L* and the chroma C* is determined from the table in FIG. 15 determined by the given four points ($P_1$, $P_2$, $P_3$, and $P_4$). The brightness and chromaticity separation signals L*a*b* and the UCR percentage α are converted into YMCK by nonlinear conversion operation 143 using the neural network. The conversion result is held as the contents with the brightness and chromaticity separation signals L*a*b* as address in the record color data hold section 502. This procedure is repeated for all addresses of the record color data hold section 502, thereby providing all necessary data. Different CMYK sets for each of the modes are stored in a predetermined memory and the CMYK set for the necessary mode is loaded into the record color data hold section 502 through an external user interface. The contents of the sensitivity data hold sections 503-1, 503-2, and 503-3 are easily provided by finding the difference between contiguous addresses of the contents of the record color data hold section 502.

Figure 16:
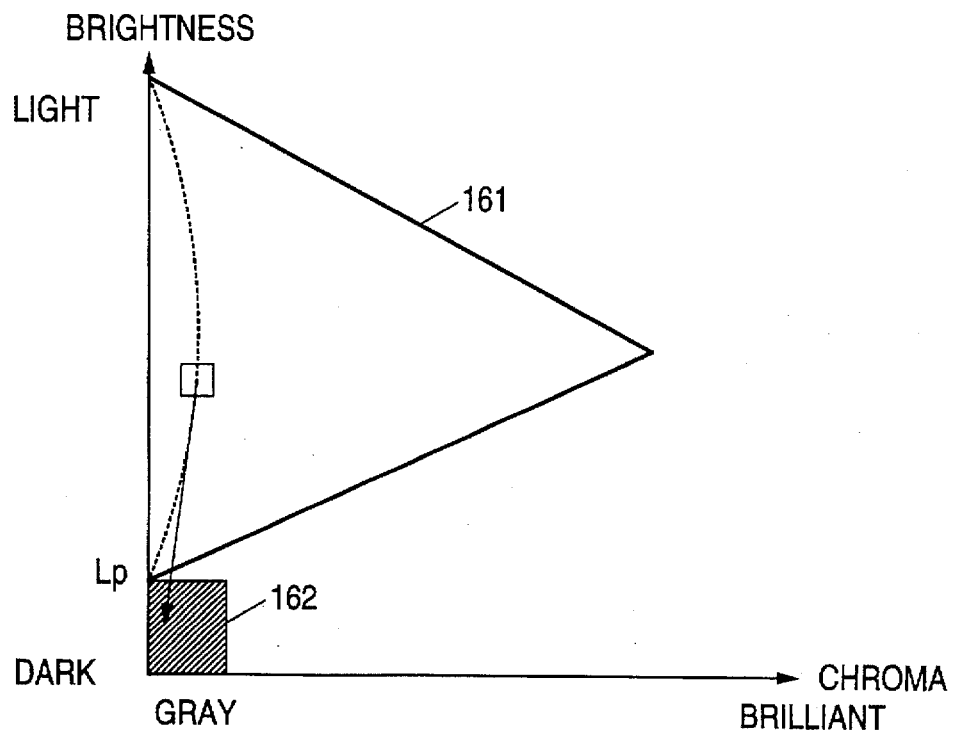
FIG. 16 is an illustration explaining the effect of an India ink monochrome area set in the color conversion table in a processing mode of a document with half-tone and character images mixed.

The data provided from the steps is corrected for the reproducing mode of character and half-tone images, as described below: In the mode, it is necessary to realize India ink monochrome reproduction of black characters and satisfy faithful color reproduction of half-tone images. Thus, an area in which record color data other than India ink in color conversion table data is set to 0 is set as a specific area centering on achromatic color having low brightness. In FIG. 16, the brightness of brightness and chromaticity separation signals is used to enter the vertical axis and the chroma calculated from the chromaticity is used to enter the horizontal axis; an area 161 indicated by the solid line represents a record color reproduction area and a shaded portion 162 is an area in which record color data other than India ink is set to 0. The half-tone image brightness range is converted into an range of brightness Lp or more by the nonlinear range converter 3 in FIG. 1 so that the half-tone image enters the record color reproduction area for the brightness signal. After this, it is smoothed by edge processing, thus only conversion data in the range of brightness Lp or more in FIG. 16 is used in the color conversion table.

On the other hand, black character signal (□ in FIG. 16) is enhanced in brightness by edge processing and compressed in chroma (in the arrow direction in FIG. 16) at the same time. At the time, if a given or more brightness enhancement gain is taken, the brightness after enhancement becomes Lp or less. At the time, since record color data other than India ink is set to 0 in the color conversion table, complete India ink monochrome reproduction is carried out.

Thus, the range conversion of the nonlinear range converter 3 and the specific area in which record color data other than India ink in the color conversion table data is set to 0 are combined, whereby the color conversion table use area of a half-tone image and a black character signal can be separated for executing color conversion as faithful reproduction for the half-tone image and that as India ink monochrome reproduction for the black character at the same time without a contradiction.

Thus, according to the invention, optimum brightness chroma conversion for half-tone images, black characters, and color characters is executed in the brightness range conversion and edge processing, then conversion to record color is executed so that reproduction in the vicinity of achromatic color becomes substantial India ink monochrome reproduction and that reproduction at a given chroma or more becomes 3-color reproduction within the range insuring faithful color reproduction. Black characters and half-tone images differ in color conversion table use area, enabling India ink monochrome reproduction of black characters without impairing faithful reproduction of half-tone images. As a result, according to the invention, for a document with photo and character images mixed, image roughness can be reduced for the photo images and the black character quality and color character quality can be improved for the character images. An unnatural image defect occurring in the conventional half-tone image and character image separation processing can also be removed completely.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A color image processing system for generating image signals containing color information of four colors, including black, the four-color image signals generated from original image signals containing color information of three colors, said color image processing system comprising:
   means for converting the original three-color image signals into separated brightness and chromaticity signals;
   range conversion means for converting the brightness signal into a range converted brightness signal that is within a record color reproduction range;
   edge detection means for detecting edges and generating an edge amount signal from the range converted brightness signal;
   chroma detection means for detecting chroma from the chromaticity signal;
   edge enhancement means for enhancing edges of an image represented by the range converted brightness signal;
   smoothing means for smoothing the range converted brightness signal;
   brightness and chromaticity conversion means comprising means for executing brightness conversion by mixing an output of said edge enhancement means and an output of said smoothing means according to the edge amount signal, and means for executing chromaticity conversion that generates a chromaticity signal corresponding to compression/expansion of the chroma according to an output of said edge detection means and an output of said chroma detection means; and
   record color conversion means connected to receive an output of said brightness and chromaticity conversion means and for generating the four-color image signals containing India ink using a color conversion table.

2. The color image processing system as claimed in claim 1 wherein said range conversion means has a conversion characteristic set according to a parameter for defining white points of an image and a parameter for compressing the brightness signal within the color reproduction range of the recorder.

3. The color image processing system as claimed in claim 1, wherein each of said edge detection means and said chroma detection means comprises nonlinear conversion means for converting the edge amount signal and the chroma detected by the chroma detecting means, respectively, based on conversion parameters set changeably from an outside.

4. The color image processing system as claimed in claim 3, wherein said nonlinear conversion means for executing nonlinear conversion of an output from said edge detection means has a conversion characteristic with a conversion output signal fe being normalized between 0 and 1 and controlled according to a plurality of parameters,
   said plurality of parameters containing a first parameter for controlling an upper limit value of the conversion output signal fe set to 0 and a second parameter for controlling a lower limit value of the conversion output signal fe set to 1.

5. The color image processing system as claimed in claim 3, wherein said nonlinear conversion means for executing nonlinear conversion of an output from said chroma detection means has a conversion characteristic with a conversion output signal fc being normalized between 1 and −1 and controlled according to a plurality of parameters,
   said plurality of parameters containing a first parameter for controlling an upper limit value of the conversion output signal fc set to −1, a second parameter for controlling a lower limit value of the conversion output signal fc set to 0, a third parameter for controlling an upper limit value of the conversion output signal fc set to 0, and a fourth parameter for controlling a lower limit value of the conversion output signal fc set to 1.

6. The color image processing system as claimed in claim 5, wherein said second nonlinear conversion means has a conversion characteristic with a conversion output signal fc normalized between 1 and −1 and controlled according to a plurality of parameters;
   said plurality of parameters containing a first parameter for controlling an upper limit value of the conversion output signal fc set to −1, a second parameter for controlling a lower limit value of the conversion output signal fc set to 0, a third parameter for controlling an upper limit value of the conversion output signal fc set to 0, and a fourth parameter for controlling a lower limit value of the conversion output signal fc set to 1.

7. The color image processing system as claimed in claim 6, further comprising means for adjusting the conversion characteristic parameters in said second nonlinear conversion means.

8. The color image processing system as claimed in claim 1, wherein different types of data are in the color conversion table for selection in response to an image reproduction mode.

9. The color image processing system as claimed in claim 1, wherein a specific area centering on achromatic color having low brightness in which record color data other than India ink is set to 0 is set in the color conversion table.

10. The color image processing system as claimed in claim 1, wherein a percentage of India ink of the color conversion table data and minimum value of record color data other than India ink decreases monotonically with an increase in the chroma.

11. The color image processing system as claimed in claim 1, wherein a relationship between the India ink of the color conversion table data and a minimum value of record color data other than India ink is set by no more than four parameter sets of brightness and chroma.

12. A method of processing a color image, comprising the steps of:

executing range conversion of a brightness signal so that the brightness signal is within a record color reproduction area;

obtaining an edge amount signal from the range converted brightness signal;

obtaining a smoothed brightness signal from the range converted brightness signal and an edge enhanced brightness signal from the range converted brightness signal;

obtaining a chroma signal of an image from a chromaticity signal;

executing brightness and chromaticity conversion by mixing the smoothed brightness signal and the edge enhanced brightness signal according to the edge amount signal, to provide a chromaticity signal corresponding to compression/expansion of the chroma according to the edge amount signal and the chroma signal;

preparing a color conversion table; and converting an output signal from the brightness and chromaticity conversion step, using said conversion table, into output unit image signals of four colors containing India ink, wherein said color conversion table includes record color data other than black color is set to 0 for conversion of a signal of achromatic color having low brightness.

13. A color image processing system, comprising:

edge detection means for obtaining an edge amount signal from a brightness signal obtained from an image signal consisting of color components;

edge enhancement means for enhancing edges of an image represented by the brightness signal;

means for smoothing the brightness signal;

means for detecting a chroma signal of an image from a chromaticity signal obtained from the image signal consisting of color components;

means for executing brightness conversion by mixing an output of said edge enhancement means and an output of said smoothing means according to the edge amount signal; and means for executing chromaticity conversion for providing a chromaticity signal corresponding to compression/expansion of the chroma according to the edge amount signal output from said edge detection means and an output of said chroma detection means.

14. The color image processing system as claimed in claim 13, further comprising first nonlinear conversion means for executing nonlinear conversion of an output of said edge detection means.

15. The color image processing system as claimed in claim 14, wherein said first nonlinear conversion means has a conversion characteristic with a conversion output signal fe being normalized between 0 and 1 and controlled according to a plurality of parameters;

said plurality of parameters containing a first parameter for controlling an upper limit value of the conversion output signal fe set to 0 and a second parameter for controlling a lower limit value of the conversion output signal fe set to 1.

16. The color image processing system as claimed in claim 14, further comprising means for adjusting the conversion characteristic parameters in said first nonlinear conversion means.

17. The color image processing system as claimed in claim 14, wherein said brightness conversion means comprises weighted averaging means for providing weighted average output $L^{*'}$ by performing operation on output $L^*p$ of said smoothing means and output $L^*c$ of said edge enhancement means with output fe of said first nonlinear conversion means as a weight value according to the following expression:

$$L^{*'}=fe \cdot L^*c+(1-fe) \cdot L^*p.$$

18. The color image processing system as claimed in claim 13, further comprising a second nonlinear conversion means for executing nonlinear conversion of an output of said chroma detection means.

19. The color image processing system as claimed in claim 13, wherein said brightness conversion means has means for limiting the maximum value of brightness conversion output based on edge weight and chroma conversion signal.

20. The color image processing system as claimed in claim 13, wherein said color conversion means further includes coefficient determination means for calculating a coefficient k from edge weight fe and a chroma conversion signal fc as k=1+fe*fc and coefficient operation means for multiplying the chromaticity signal by the coefficient k calculated by said coefficient determination means.

21. A method of processing a color image, comprising the steps of:

obtaining an edge amount signal from a brightness signal obtained from an image signal consisting of color components;

obtaining a smoothed brightness signal and an edge enhanced brightness signal from the brightness signal;

obtaining a chroma signal from a chromaticity signal obtained from the image signal consisting of color components;

mixing the smoothed brightness signal image and the edge enhanced brightness signal based on the edge amount signal; and providing a chromaticity signal corresponding to compression or expansion of the chroma using the edge amount signal and the chroma signal.

22. A color-image processing system, comprising:

edge detection means for obtaining an edge amount signal from brightness and chromaticity separation signals;

edge enhancement means for enhancing edges of an image represented by said brightness signal;

smoothing means for smoothing said brightness signal;

chroma detection means for detecting a chroma signal from said brightness and chromaticity separation signals;

means for executing brightness conversion by mixing an output of said edge enhancement means and an output of said smoothing means according to an edge amount signal detected by said edge detection means; and brightness conversion limit means for limiting brightness conversion according to the edge amount signal detected by said edge detection means and the chroma signal detected by said chroma detection means.

* * * * *